(12) United States Patent
Westerlund et al.

(10) Patent No.: US 12,744,813 B2
(45) Date of Patent: Sep. 22, 2026

(54) DTLS FOR SCTP AS BUMP IN THE STACK FOR REKEYING/REAUTHENTICATING

(71) Applicant: Telefonaktiebolaget LM Ericsson (publ), Stockholm (SE)

(72) Inventors: Magnus Westerlund, Upplands Väsby (SE); Claudio Porfiri, Stockholm (SE); John Preuss Mattsson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/126,235

(22) PCT Filed: Nov. 1, 2023

(86) PCT No.: PCT/IB2023/060985

§ 371 (c)(1),
(2) Date: Apr. 30, 2025

(87) PCT Pub. No.: WO2024/095166

PCT Pub. Date: May 10, 2024

(65) Prior Publication Data

US 2026/0156152 A1 Jun. 4, 2026

Related U.S. Application Data

(60) Provisional application No. 63/382,496, filed on Nov. 4, 2022.

(51) Int. Cl.
*H04L 9/40* (2022.01)

(52) U.S. Cl.
CPC .......... *H04L 63/166* (2013.01); *H04L 63/068* (2013.01); *H04L 63/08* (2013.01)

(58) Field of Classification Search
CPC ...... H04L 63/166; H04L 63/068; H04L 63/08
See application file for complete search history.

(56) References Cited

U.S. PATENT DOCUMENTS 11,722,561 B2 * 8/2023 Westerlund ........... H04L 63/166 709/238
2015/0372876 A1 12/2015 Turon et al.
(Continued)

FOREIGN PATENT DOCUMENTS

EP 2552076 A2 1/2013
EP 4021069 A1 6/2022
(Continued)

OTHER PUBLICATIONS

3GPP TS 33.501, "3rd Generation Partnership Project; Technical Specification Group Services and System Aspects; Security Architecture and Procedures for 5G System (Release 17)", V17.3.0, Sep. 2021, pp. 1-258.

(Continued)

*Primary Examiner* — Chau Le
(74) *Attorney, Agent, or Firm* — Nicholson De Vos Webster & Elliott LLP

(57) ABSTRACT

A method and a network node for rekeying or re-authenticating security protection for Stream Control Transmission Protocol (SCTP) association using Datagram Transport Layer Security (DTLS) encryption for SCTP chunk transfer. The method comprises establishing a new DTLS connection between a first network node and a second network node using an existing SCTP association employing an existing DTLS connection between the two nodes to transfer DTLS handshake messages. The method further comprises commencing to use the new DTLS connection for protecting the SCTP chunk transfer using the DTLS encryption between the two nodes by transmitting SCTP chunks protected by DTLS encryption using the new DTLS connection; and closing the existing DTLS connection after an elapsed time period after commencing to use the new DTLS connection.

20 Claims, 19 Drawing Sheets

(56) References Cited

U.S. PATENT DOCUMENTS

2015/0381657 A1* 12/2015 Kelson ................ H04L 63/0281 713/153
2017/0033889 A1 2/2017 Ma et al.
2018/0316500 A1* 11/2018 Xu ...................... H04L 63/0435
2018/0376516 A1 12/2018 Bandlamudi
2019/0207776 A1* 7/2019 Wang .................. H04L 63/0428
2022/0201069 A1* 6/2022 Westerlund ........... H04L 63/166
2024/0430242 A1* 12/2024 Westerlund ......... H04L 63/0869

FOREIGN PATENT DOCUMENTS

WO 2023/067400 A1 4/2023
WO WO-2024095166 A1 * 5/2024 ........... H04L 63/166

OTHER PUBLICATIONS

3GPP TS 38.413, "3rd Generation Partnership Project; Technical Specification Group Radio Access Network; NG-RAN; NG Application Protocol (NGAP) (Release 16)", V16.6.0, Jul. 2021, pp. 1-473.
3GPP TS 38.423, "3rd Generation Partnership Project; Technical Specification Group Radio Access Network; NG-RAN; Xn Application Protocol (XnAP) (Release 16)", V16.6.0, Jul. 2021, pp. 1-464.
3GPP TS 38.463, "3rd Generation Partnership Project; Technical Specification Group Radio Access Network; NG-RAN; E1 Application Protocol (E1AP) (Release 16)", V16.6.0, Jul. 2021, pp. 1-239.
3GPP TS 38.473, "3rd Generation Partnership Project; Technical Specification Group Radio Access Network; NG-RAN; F1 Application Protocol (F1AP) (Release 16)", V16.6.0, Jul. 2021, pp. 1-466.
Anssi, "Recommendations for Securing Networks with IPsec", Technical Report, No. DAT-NT-003-EN, Aug. 3, 2015, 17 pages.
Barnes et al., "Confidentiality in the Face of Pervasive Surveillance: A Threat Model and Problem Statement", Internet Architecture Board (IAB), Request for Comments: 7624, Aug. 2015, pp . 1-24.
Belshe et al., "Hypertext Transfer Protocol Version 2 (HTTP/2)", Internet Engineering Task Force (IETF), Request for Comments: 7540, May 2015, pp. 1-96.
Bhargavan et al., "Transport Layer Security (TLS) Session Hash and Extended Master Secret Extension", Internet Engineering Task Force (IETF), Request for Comments: 7627, Sep. 2015, pp. 1-15.
Bhargavan et al., "Triple Handshakes and Cookie Cutters: Breaking and Fixing Authentication over TLS", 2014 IEEE Symposium on Security and Privacy, 2014, pp. 1-16.
Bradner, S., "Key Words for Use in RFCs to Indicate Requirement Levels", Network Working Group, Request for Comments: 2119, Mar. 1997, pp. 1-3.
Cooper et al., "Privacy Considerations for Internet Protocols", Internet Architecture Board (IAB), Request for Comments: 6973, Jul. 2013, pp. 1-36.
Dierks et al., "The Transport Layer Security (TLS) Protocol Version 1.2", Network Working Group, Request for Comments: 5246, Aug. 2008, pp. 1-104.
Farrell et al., "Pervasive Monitoring is an Attack", Internet Engineering Task Force (IETF), Request for Comments: 7258, May 2014, pp. 1-6.
Hohendorf et al., "Secure SCTP", Network Working Group, Internet Draft: draft-hohendorf-secure-sctp-33, Sep. 17, 2022, 39 pages.
Huang et al., "Dual Stack Hosts using the "Bump-In-the-Stack" Technique (BIS)—draft-huang-behave-rfc2767bis-02", Behave, Internet Draft, Obsoletes: 2767, Mar. 7, 2010, pp. 1-18.
IANA (Internet Assigned Numbers Authority), "Stream Control Transmission Protocol (SCTP) Parameters", Available Online at <https://www.iana.org/assignments/sctp-parameters/sctp-parameters.xhtml#sctp-parameters-27>, Nov. 7, 2022, 18 pages.
Jungmaier et al., "Transport Layer Security over Stream Control Transmission Protocol", Network Working Group, Request for Comments: 3436, Dec. 2002, pp. 1-9.
Leiba, B., "Ambiguity of Uppercase vs Lowercase in RFC 2119 Key Words", Internet Engineering Task Force (IETF), Request for Comments: 8174, May 2017, pp. 1-4.
Loughney et al., "Security Considerations for Signaling Transport (SIGTRAN) Protocols", Network Working Group, Request for Comments: 3788, Jun. 2004, pp. 1-13.
Moriarty et al., "Deprecating TLS 1.0 and TLS 1.1", Internet Engineering Task Force (IETF), Request for Comments: 8996, Mar. 2021, pp. 1-18.
Rescorla et al., "Connection Identifiers for DTLS 1.2—draft-ietf-tls-dtls-connection-id-13", TLS, Internet Draft, Updates 6347, Jun. 22, 2021, pp. 1-21.
Rescorla et al., "Datagram Transport Layer Security Version 1.2", Internet Engineering Task Force (IETF), Request for Comments: 6347, Jan. 2012, pp. 1-32.
Rescorla et al., "The Datagram Transport Layer Security (DTLS) Protocol Version 1.3—draft-ietf-tls-dtls 13-43", TLS, Internet Draft, Obsoletes 6347, Apr. 30, 2021, pp. 1-81.
Rescorla et al., "The Datagram Transport Layer Security (DTLS) Protocol Version 1.3", Internet Engineering Task Force (IETF), Request for Comments: 9147, Apr. 2022, pp. 1-61.
Rescorla et al., "Transport Layer Security (TLS) Renegotiation Indication Extension", Internet Engineering Task Force (IETF), Request for Comments: 5746, Feb. 2010, pp. 1-15.
Rescorla, E., "Keying Material Exporters for Transport Layer Security (TLS)", Internet Engineering Task Force (IETF), Request for Comments: 5705, Mar. 2010, pp. 1-7.
Rescorla, E., "The Transport Layer Security (TLS) Protocol Version 1.3—draft-ietf-tls-tlsl3-28", Network Working Group, Internet Draft, Obsoletes 5077, 5246, 6961, Mar. 20, 2018, pp. 1-156.
Rescorla, E., "The Transport Layer Security (TLS) Protocol Version 1.3", Internet Engineering Task Force (IETF), Request for Comments: 8446, Aug. 2018, pp. 1-160.
Salowey et al., "IANA Registry Updates for TLS and DTLS", Internet Engineering Task Force (IETF), Request for Comments: 8447, Aug. 2018, pp. 1-20.
Sheffer et al., "Recommendations for Secure Use of Transport Layer Security (TLS) and Datagram Transport Layer Security (DTLS)", Internet Engineering Task Force (IETF), Request for Comments: 7525, May 2015, pp. 1-27.
Sheffer et al., "Summarizing Known Attacks on Transport Layer Security (TLS) and Datagram TLS (DTLS)", Internet Engineering Task Force (IETF), Request for Comments: 7457, Feb. 2015, pp. 1-13.
Stewart et al., "Sockets API Extensions for the Stream Control Transmission Protocol (SCTP)", Internet Engineering Task Force (IETF), Request for Comments: 6458, Dec. 2011, pp. 1-115.
Stewart et al., "Stream Control Transmission Protocol (SCTP) Dynamic Address Reconfiguration", Network Working Group, Request for Comments: 5061, Sep. 2007, pp. 1-41.
Stewart et al., "Stream Control Transmission Protocol (SCTP) Partial Reliability Extension", Network Working Group, Request for Comments: 3758, May 2004, pp. 1-22.
Stewart et al., "Stream Control Transmission Protocol", Internet Engineering Task Force (IETF), Request for Comments: 9260, Jun. 2022, pp. 1-133.
Stewart et al., "Stream Schedulers and User Message Interleaving for the Stream Control Transmission Protocol", Internet Engineering Task Force (IETF), Request for Comments: 8260, Nov. 2017, pp. 1-23.
Stewart, R., "Stream Control Transmission Protocol", Network Working Group, Request for Comments: 4960, Sep. 2007, pp. 1-152.
Tsuchiya et al., "Dual Stack Hosts using the "Bump-In-the-Stack" Technique (BIS)", Network Working Group, Request for Comments: 2767, Feb. 2000, pp. 1-14.
Tuexen et al., "Authenticated Chunks for the Stream Control Transmission Protocol (SCTP)", Network Working Group, Request for Comments: 4895, Aug. 2007, pp. 1-19.

(56) References Cited

OTHER PUBLICATIONS

Tuexen et al., "Datagram Transport Layer Security (DTLS) for Stream Control Transmission Protocol (SCTP)", Internet Engineering Task Force (IETF), Request for Comments: 6083, Jan. 2011, pp. 1-9.

Westerlund et al., "Datagram Transport Layer Security (DTLS) in the Stream Control Transmission Protocol (SCTP) Crypto Chunk—draft-westerlund-tsvwg-sctp-crypto-dtls-01", TSVWG, Internet Draft, Jun. 28, 2023, pp. 1-27.

Westerlund et al., "Datagram Transport Layer Security (DTLS) over Stream Control Transmission Protocol (SCTP)—draft-ietf-tsvwg-dtls-over-sctp-bis-01", TSVWG, Internet Draft, Obsoletes 6083, Jul. 12, 2021, pp. 1-14.

Westerlund et al., "Datagram Transport Layer Security (DTLS) over Stream Control Transmission Protocol (SCTP)—draft-ietf-tsvwg-dtls-over-sctp-bis-05", TSVWG, Internet Draft, Oct. 24, 2022, pp. 1-43.

Westerlund et al., "Datagram Transport Layer Security (DTLS) over Stream Control Transmission Protocol (SCTP)", TSVWG, Internet Draft: draft-ietf-tsvwg-dtls-over-sctp-bis-02, Obsoletes 6083, Oct. 25, 2021, 30 pages.

Westerlund et al., "Stream Control Transmission Protocol (SCTP) Crypto Chunk—draft-westerlund-tsvwg-sctp-crypto-chunk-02", TSVWG, Internet Draft, Sep. 8, 2023, pp. 1-30.

* cited by examiner

FIG. 15

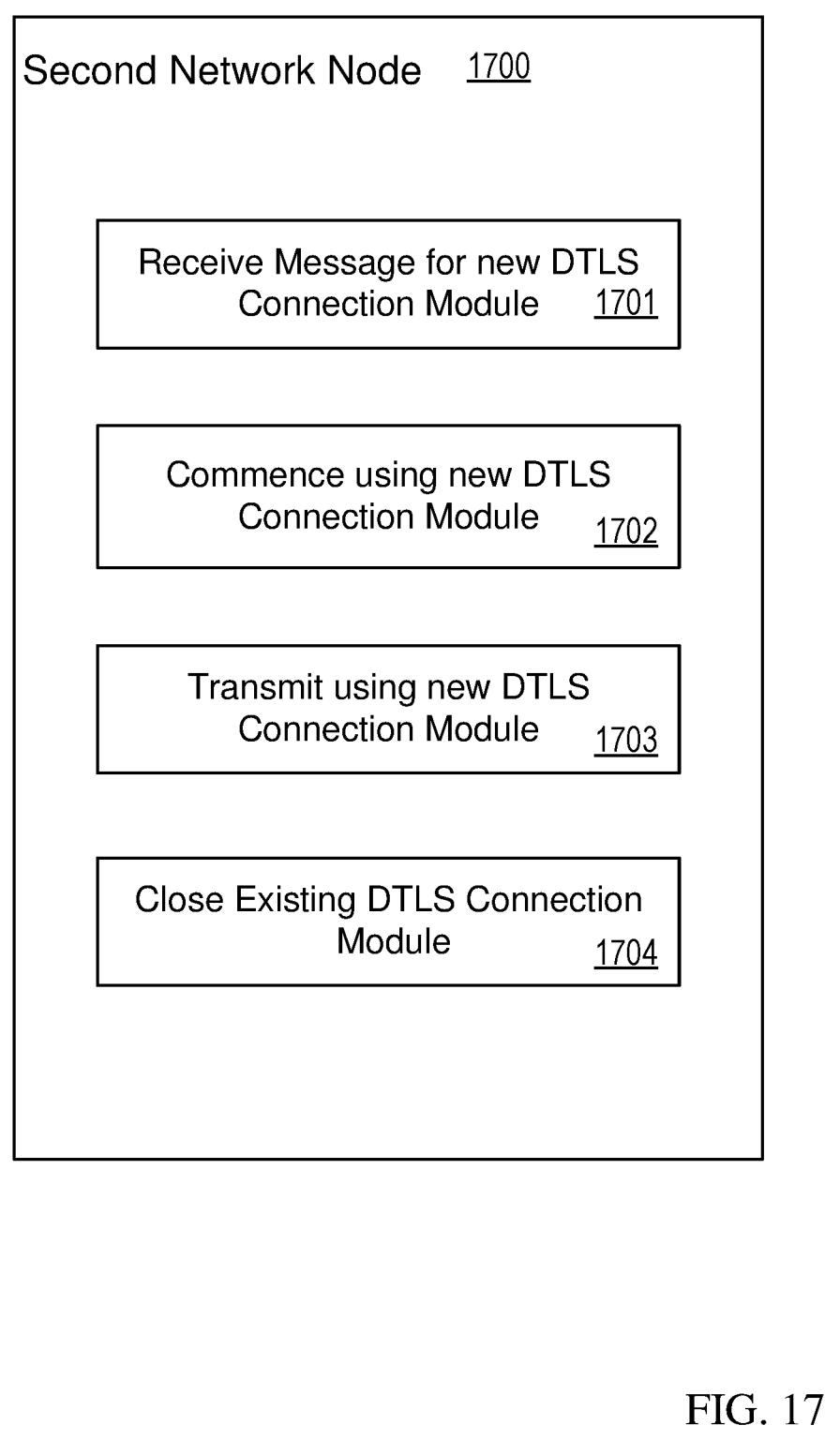

Second Network Node 1700

Receive Message for new DTLS Connection Module 1701

Commence using new DTLS Connection Module 1702

Transmit using new DTLS Connection Module 1703

Close Existing DTLS Connection Module 1704

FIG. 17

DTLS FOR SCTP AS BUMP IN THE STACK FOR REKEYING/REAUTHENTICATING

CROSS-REFERENCE TO RELATED APPLICATIONS

This application is a National stage of International Application No. PCT/IB2023/060985, filed Nov. 1, 2023, which claims the benefit of U.S. Provisional Application No. 63/382,496, filed Nov. 4, 2022, which are all hereby incorporated by reference.

TECHNICAL FIELD

Embodiments of the disclosure relate to the field of signaling and data transfer; and more specifically, to use of Datagram Transport Layer Security (DTLS) encryption for Stream Control Transmission Protocol (SCTP) packet transfer.

BACKGROUND

Stream Control Transmission Protocol (SCTP) is used as transport protocol for a number of 3rd Generation Partnership Project (3GPP) defined signaling protocols, such as Xn, F1, E1, NG-C. The signaling messages sent by these protocols need security to provide authentication, integrity, confidentiality, replay and availability against a number of threats. Internet Engineering Task Force (IETF) Request for Comment (RFC) 6083 defined a solution for Datagram Transport Layer Security (DTLS) over SCTP relying on DTLS (e.g., RFC 6347 and RFC9147) for confidentiality of signaling protocol messages and relying on authenticated SCTP (SCTP-AUTH) (e.g., RFC4895) for integrity and replay protection. RFC 6083 however has a limitation that the largest supported signaling message is 16,384 bytes. To address this, draft-ietf-tsvwg-dtls-over-sctp-bis-05 has been worked on to define a replacement for RFC 6083 providing security for the upper layer signaling message of larger sizes, also relying on the SCTP-AUTH. Secure-SCTP (S-SCTP) (e.g., draft-hohendorf-secure-sctp-34) is another proposal for an integrated SCTP security solution.

During the work on draft-ietf-tsvwg-dtls-over-sctp-bis-05 it was discovered that SCTP-AUTH has several weaknesses, allowing for reflection attacks, data replay attacks unless rekeyed frequently enough when used in long lived sessions, and also not protecting several types of SCTP control chunks against replay. These weaknesses affect integrity and may affect confidentiality as integrity of user messages is no longer provided. Confidentiality is only offered against passive attacker instead of confidentiality against active attackers offered by modern DTLS cipher suites. Thus, making users of SCTP-AUTH vulnerable to attack for the DTLS over SCTP solutions in RFC 6083 and draft-ietf-tsvwg-dtls-over-sctp-bis-05. The current DTLS over SCTP solution can also introduce much overhead.

Furthermore, the DTLS protection only of the upper layer user messages does not provide additional security that confidentiality of the SCTP headers and control chunks could provide. Confidentiality of SCTP headers and chunks limits third-party insight into SCTP state.

Additionally, the current DTLS over SCTP (e.g., provided in draft-ietf-tsvwg-dtls-over-sctp-bis-05) rekeying solution is complicated and can take a fair amount of time to complete due to its need to verify that all SCTP packets, having data protected with the old key, have been securely delivered. The ease of this depends on the Application Programming Interface (API) to the SCTP stack.

Also, defining a new complete solution for security, such as S-SCTP, means that one must define and verify all the security functions, such as handshake, key derivation etc. This can involve significant amount of work.

SUMMARY

Certain aspects of the disclosure and their embodiments may provide solutions to these or other challenges. To resolve the known problems with RFC 6083, draft-ietf-tsvwg-dtls-over-sctp-bis-05, and SCTP-AUTH (e.g., RFC4895), the disclosed solution herein applies DTLS in a different step in the SCTP processing than the existing solutions. DTLS protection is applied on all SCTP chunks in each SCTP packet when the DTLS connection has been established. The DTLS record containing the SCTP chunks can be included in the packet either directly after the SCTP common header and/or with a SCTP chunk header, as the payload in a new chunk, which is called herein as the DTLS chunk. The DTLS protection operation will happen in the SCTP stack between the basic packet transmission and reception, and the creation and processing of the other SCTP chunks. Because the DTLS encryption operation is performed as a step within the SCTP operation, akin to forming a bump in the SCTP stack operation, it is referred herein as a "bump in the stack."

Each transmission of an SCTP packet will encrypt the SCTP packet payload as part of the process of transmitting the packet. In some embodiments, this allows the DTLS sequence number to be monotonically increased, thus enabling use of the DTLS replay protection that was not possible in RFC 6083 and draft-ietf-tsvwg-dtls-over-sctp-bis-05.

The initial DTLS handshake can be embedded as part of the SCTP association 4-way handshake and may continue directly afterwards, having to be completed before any upper layer data is transmitted in SCTP DATA chunks. To support long lived SCTP association with mutual re-authentication, and frequent Ephemeral Diffie-Hellman, a new parallel DTLS connection is established when need occurs. Then DTLS protection can switch over to the new DTLS connection security context. After sufficient time or a transmission window worth of SCTP packets has been sent with the new DTLS connection, the old DTLS connection can be closed.

In one aspect of the disclosed system a method at a first network node provides for rekeying or re-authenticating security protection for Stream Control Transmission Protocol (SCTP) association between the first network node and a second network node protected using Datagram Transport Layer Security (DTLS) encryption for SCTP chunk transfer by: establishing a new DTLS connection between the first network node and the second network node using an existing SCTP association employing an existing DTLS connection between the first network node and the second network node to transfer DTLS handshake messages; commencing to use the new DTLS connection for protecting the SCTP chunk transfer using the DTLS encryption between the first network node and the second network node by transmitting, from the first network node to the second network node, SCTP chunks protected by DTLS encryption using the new DTLS connection, wherein the DTLS encryption comprises having at least one chunk for SCTP processing and encrypting the at least one chunk using the DTLS encryption to generate a DTLS record of the at least one chunk; and closing the existing DTLS connection after an elapsed time period after commencing to use the new DTLS connection.

In another aspect of the disclosed system, the DTLS encryption further includes attaching a SCTP chunk header to the DTLS record to identify the at least one chunk as DTLS encrypted.

In another aspect of the disclosed system, the DTLS encryption further includes: attaching a common SCTP header to the DTLS record to generate a SCTP packet for SCTP transmission to the second network node; or attaching a common SCTP header to a SCTP chunk header and the DTLS record to generate a SCTP packet for SCTP transmission to the second network node.

In another aspect of the disclosed system, a SCTP association for the new DTLS connection uses an existing DTLS session for encryption of the SCTP chunk transfer carrying DTLS handshake messages.

In another aspect of the disclosed system, the new DTLS connection is for re-keying the security protection of a SCTP association.

In another aspect of the disclosed system, the new DTLS connection is for re-authenticating the security protection of a SCTP association.

In another aspect of the disclosed system, the SCTP chunk header includes information to identify the DTLS record, the information being: type of chunk; connection identifier; chunk length; or any combination of the listed items.

In another aspect of the disclosed system, the second network node identifies which security context to use for received DTLS records based on the connection identifier.

In another aspect of the disclosed system, the closing the existing DTLS connection is initiated in a DTLS message transmitted in a DTLS record.

In another aspect of the disclosed system, the closing of the existing DTLS connection is initiated either by the first network node or the second network node.

In another aspect of the disclosed system, a method at a second network node provides for rekeying or re-authenticating security protection for Stream Control Transmission Protocol (SCTP) association between a first network node and the second network node protected using Datagram Transport Layer Security (DTLS) encryption for SCTP chunk transfer by: receiving, at the second network node, a DTLS handshake message from the first network node for a new DTLS connection between the first network node and the second network node using an existing SCTP association employing an existing DTLS connection between the first network node and the second network node to transfer DTLS handshake messages and continuing to establish the new DTLS connection; commencing to use the new DTLS connection for protecting SCTP chunk transfer using the DTLS encryption between the second network node and the first network node; transmitting, from the second network node to the first network node, SCTP chunks protected by DTLS encryption using the new DTLS connection, wherein the DTLS encryption comprises having at least one chunk for SCTP processing and encrypting the at least one chunk using DTLS encryption to generate a DTLS record of the at least one chunk; and closing the existing DTLS connection after an elapsed time period after commencing to use the new DTLS connection.

In another aspect of the disclosed system for the method at the second network node, the DTLS encryption further includes attaching a SCTP chunk header to the DTLS record to identify the at least one chunk as DTLS encrypted.

In another aspect of the disclosed system for the method at the second network node, the DTLS encryption further includes: attaching a common SCTP header to the DTLS record to generate a SCTP packet for SCTP transmission; or attaching a common SCTP header to a SCTP chunk header and the DTLS record to generate a SCTP packet for SCTP transmission.

In another aspect of the disclosed system for the method at the second network node, a SCTP association for the new DTLS connection uses an existing DTLS session for encryption of the SCTP chunk transfer carrying the DTLS handshake messages.

In another aspect of the disclosed system, a first network node is to rekey or re-authenticate security protection for Stream Control Transmission Protocol (SCTP) association between the first network node and a second network node protected using Datagram Transport Layer Security (DTLS) encryption for SCTP chunk transfer, the first network node is configured to: establish a new DTLS connection between the first network node and the second network node using an existing SCTP association employing an existing DTLS connection between the first network node and the second network node to transfer DTLS handshake messages; commence to use the new DTLS connection for protecting the SCTP chunk transfer using the DTLS encryption between the first network node and the second network node by a transmit, from the first network node to the second network node, of SCTP chunks protected by DTLS encryption using the new DTLS connection, wherein the DTLS encryption comprises having at least one chunk for SCTP processing and encryption of the at least one chunk using the DTLS encryption to generate a DTLS record of the at least one chunk; and close the existing DTLS connection after an elapsed time period after commencement to use the new DTLS connection.

In another aspect of the disclosed system for the first network node, the DTLS encryption further includes attachment of a SCTP chunk header to the DTLS record to identify the at least one chunk as DTLS encrypted.

In another aspect of the disclosed system for the first network node, the DTLS encryption further includes: attachment of a common SCTP header to the DTLS record to generate a SCTP packet for SCTP transmission to the second network node; or attachment of a common SCTP header to a SCTP chunk header and the DTLS record to generate a SCTP packet for SCTP transmission to the second network node.

In another aspect of the disclosed system for the first network node, the new DTLS connection is to re-key the security protection of a SCTP association.

In another aspect of the disclosed system for the first network node, the new DTLS connection is to re-authenticate the security protection of a SCTP association.

In another aspect of the disclosed system, the first network node includes at least one processor and a memory, the memory comprising instructions which, when executed by the at least one processor, cause the first network node to be configured.

In another aspect of the disclosed system, a second network node is to rekey or re-authenticate security protection for Stream Control Transmission Protocol (SCTP) association between a first network node and the second network node protected using Datagram Transport Layer Security (DTLS) encryption for SCTP chunk transfer, the second network node is configured to: receive, at the second network node, a DTLS handshake message from the first network node for a new DTLS connection between the first network node and the second network node using an existing SCTP association employing an existing DTLS connection between the first network node and the second network node to transfer DTLS handshake messages and continue to establish the new DTLS connection; commence to use the new DTLS connection for protecting SCTP chunk transfer using the DTLS encryption between the second network node and the first network node; transmit, from the second network node to the first network node, SCTP chunks protected by DTLS encryption using the new DTLS connection, wherein the DTLS encryption comprises having at least one chunk for SCTP processing and encrypting the at least one chunk using DTLS encryption to generate a DTLS record of the at least one chunk; and close the existing DTLS connection after an elapsed time period after commencing to use the new DTLS connection.

In another aspect of the disclosed system for the second network node, the DTLS encryption further includes attachment of a SCTP chunk header to the DTLS record to identify the at least one chunk as DTLS encrypted.

In another aspect of the disclosed system for the second network node, the DTLS encryption further includes: attachment of a common SCTP header to the DTLS record to generate a SCTP packet for SCTP transmission; or attachment of a common SCTP header to a SCTP chunk header and the DTLS record to generate a SCTP packet for SCTP transmission.

In another aspect of the disclosed system for the second network node, the new DTLS connection is to re-key the security protection of a SCTP association.

In another aspect of the disclosed system for the second network node, the new DTLS connection is to re-authenticate the security protection of a SCTP association.

In another aspect of the disclosed system for the second network node, the second network node includes at least one processor and a memory, the memory containing instructions which, when executed by the at least one processor, cause the second network node to be configured.

In another aspect of the disclosed system, computer program containing instructions which, when executed on at least one processor, cause the at least one processor to carry out one or more of the disclosed systems described above.

In another aspect of the disclosed system, a computer-readable storage medium has stored thereon a computer program containing instructions which, when executed on at least one processor, cause the at least one processor to carry out one or more of the disclosed systems described above.

There are, proposed herein, various embodiments which address one or more of the issues disclosed herein. Certain embodiments may provide one or more of the following technical advantages.

The adoption of the DTLS functionality below the SCTP chunk processing and the use of the DTLS sequence number for replay protection and SCTP packet authentication is a significant improvement over draft-ietf-tsvwg-dtls-over-sctp-bis-05 in several ways.

The technique can provide confidentiality, authentication, and replay protection to SCTP chunks preventing both inspection, as well as manipulation, of the SCTP association after its establishment. In case of a retransmission of a data chunk, a new SCTP packet is constructed, which will be protected and given a different DTLS sequence number than previous transmission, allowing minimal replay window only needing to be scaled to reordering behavior in the network between the transmitter and receiver.

The technique can result in less overhead, in which the per packet overhead is reduced as the SCTP-AUTH chunk is replaced with DTLS in SCTP. SCTP-AUTH has a per packet overhead of 40 bytes and it is expected that DTLS in SCTP using DTLS 1.3 can have a per packet overhead of less than 40 bytes, and possibly no more than 24 bytes.

The technique can provide better compatibility with existing DTLS implementations, potential to not require DTLS connection IDs, more limited DTLS records sizes that are used bound to Internet Protocol (IP) Maximum Transmission Unit (MTU) sizes which matches other usages of DTLS, no need to restrict the DTLS implementation from using key update, and replay protection. All in all, enabling use of an off-the shelf implementation without a need for additional features or modifications.

The disclosed technique can provide benefits of mutual authentication and forward secrecy without requiring DTLS support for rekeying and mutual re-authentication, which is lacking in DTLS 1.3. Furthermore, the out-of-order characteristics of the security context usage is limited to the network reordering characteristics, rather than being user message related, which could result in usage limitation as discussed in draft-ietf-tsvwg-dtls-over-sctp-bis-05. In addition, if a receiver would close the old DTLS connection prematurely, or even directly, after having established a new DTLS connection for rekeying, the loss of the old security context (keys) will only be the equivalent to the network dropping all the outstanding packets using the discarded keys. Resulting only in SCTP level handling of packet losses, including retransmission of any missing data chunks, thereby reducing the severity of security context termination. Furthermore, compared to S-SCTP the disclosed technique uses common security protocol (DTLS) which has been evolved and corrected over several versions.

BRIEF DESCRIPTION OF THE DRAWINGS

The disclosure may best be understood by referring to the following description and accompanying drawings that are used to illustrate particular embodiments of the disclosure. In the drawings:

FIG. 15 shows a first network node that can implement the functions of the method shown in FIG. 12 in accordance with some embodiments of the present disclosure.

FIG. 17 shows a second network node that can implement the functions of the method shown in FIG. 13 in accordance with some embodiments of the present disclosure.

DETAILED DESCRIPTION

The following description describes methods and apparatus for providing Datagram Transport Layer Security (DTLS) encryption for Stream Control Transmission Protocol (SCTP) and rekeying/reauthenticating SCTP connections using DTLS encryption. The technique can be applied to nodes preparing and/or processing SCTP messages/data/packets using SCTP and various communication connections between nodes using SCTP. The technique can be applied to clients, servers, and other functional components utilizing SCTP. The following description describes numerous specific details such as operative steps, resource implementations, data structures, types of data, types of functions, and interrelationships of system components of a communication network to provide a more thorough understanding of the present disclosure. It will be appreciated, however, by one skilled in the art that the embodiments of the present disclosure can be practiced without such specific details. In other instances, control structures, circuits, memory structures, system and/or network functions, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Furthermore, when a particular feature, structure, model, or characteristic is described in connection with an embodiment, it is submitted that it is within the knowledge of one skilled in the art to implement such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in some embodiments of the present disclosure.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 1:
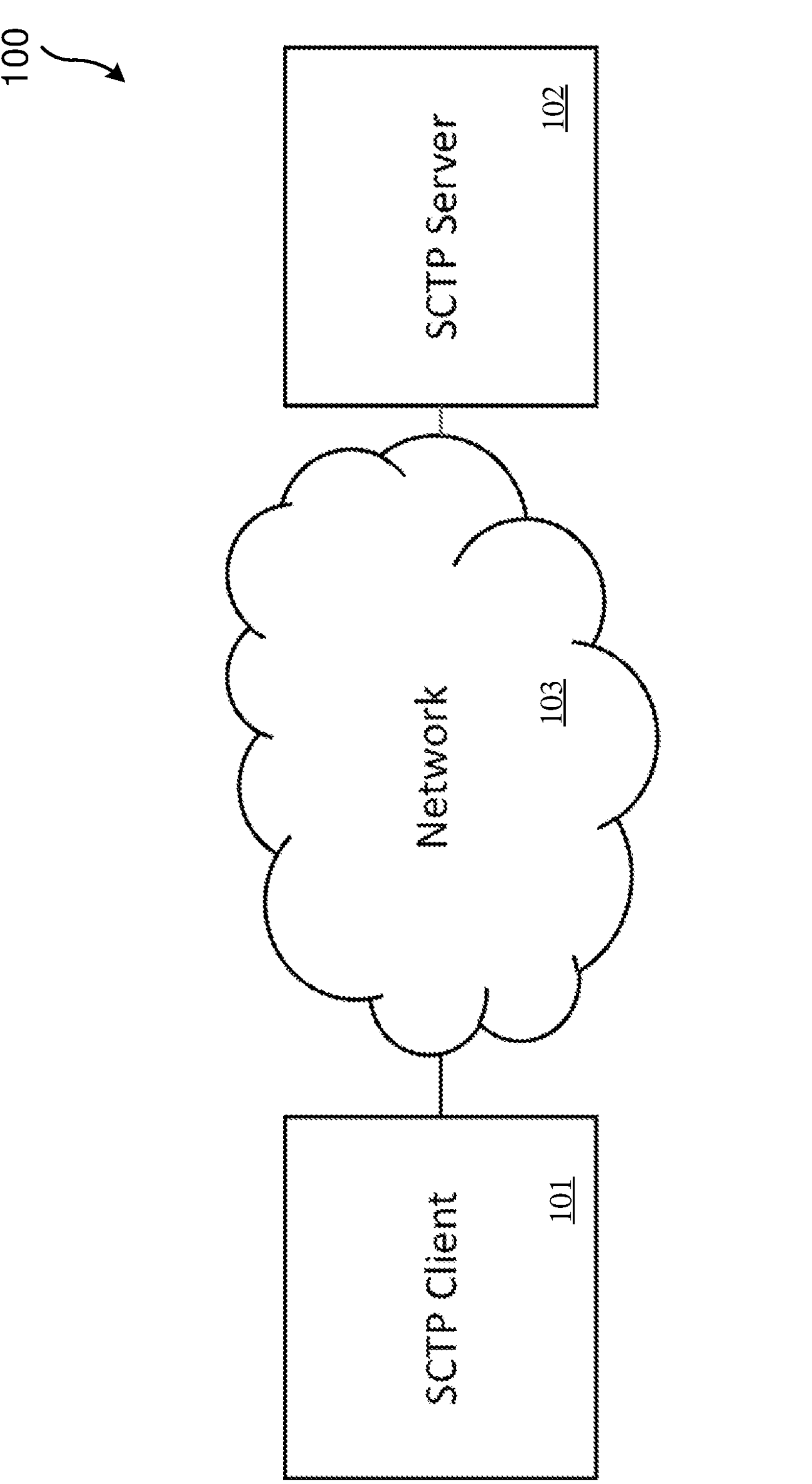
FIG. 1 shows two network nodes of a communication system connected via a network in accordance with some embodiments of the present disclosure.

This disclosure concerns securing communication between two SCTP nodes, such as an SCTP client and an SCTP server, two SCTP peers over a communication network, whether wireline or wireless. FIG. 1 shows two network nodes 101, 102 of a communication system 100 connected via a network 103. The network 103 can be any communication network that uses SCTP, such as an IP network, a mobile network, etc. The two network nodes (first network node and second network node) shown are a SCTP client node and a SCTP server node for ease of explanation. Hence, network node 101 is referred to as SCTP client 101 and network node 102 is referred to as SCTP server 102. However, as noted above, the two network nodes 101, 102 can be peer nodes, or any other pair of network nodes that operate together to transfer SCTP packets. For communication between the two network nodes 101, 102, depending on the system employed, either only one network node can initiate the signaling for the SCTP connection with the other or, alternatively, either network node can initiate the signaling for the SCTP connection. The use of DTLS encryption for SCTP packet transfer provides security for mutual authentication of the client and the server, confidentiality, integrity, and replay protection for all user data as well as SCTP protocol details.

Encryption

Figure 2:
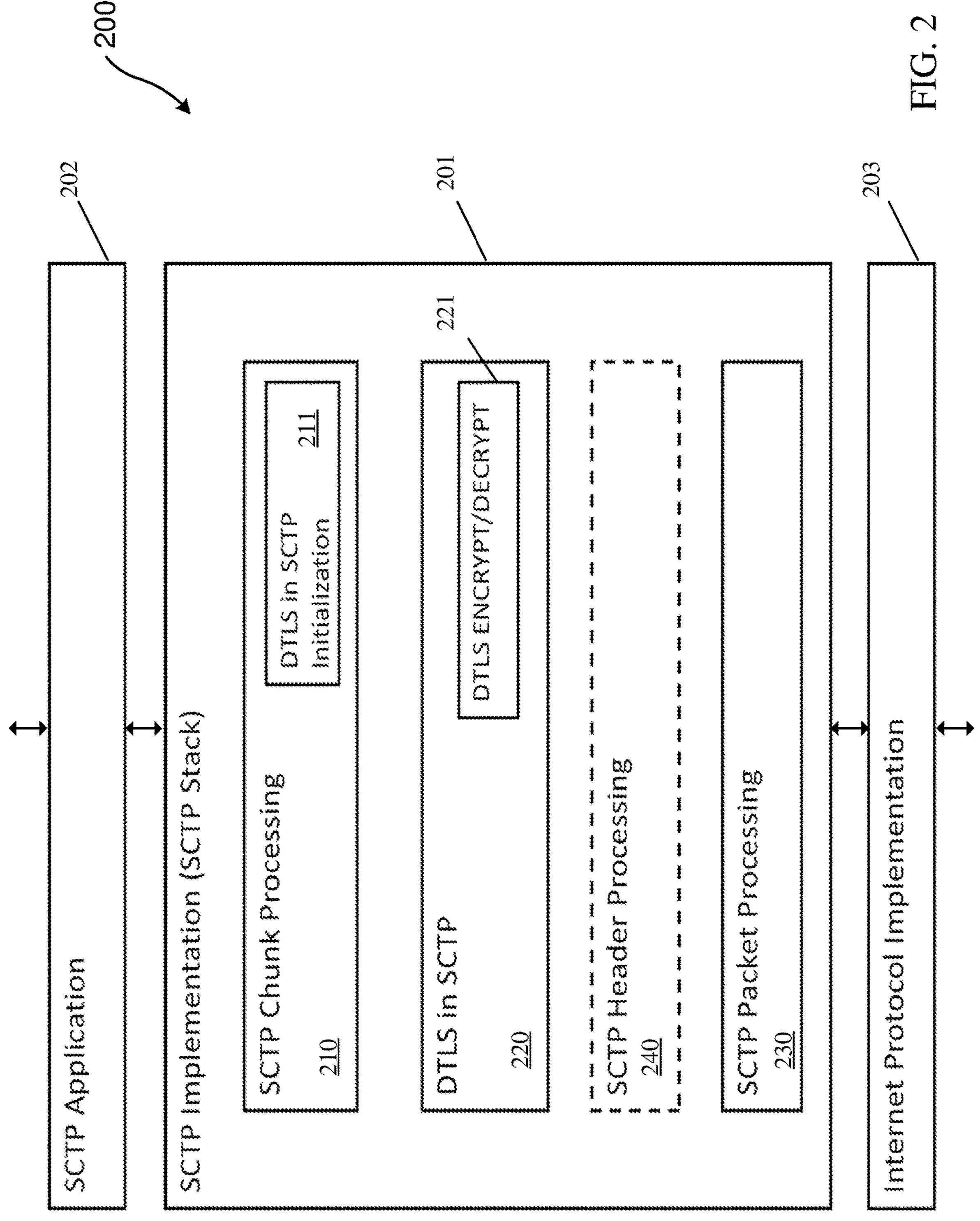
FIG. 2 shows DTLS in SCTP in relation to SCTP related functions in accordance with some embodiments of the present disclosure.

The DTLS based security solution for SCTP described herein is referred to as DTLS in SCTP and the DTLS encryption is part of the SCTP implementation. FIG. 2 shows DTLS in SCTP in relation to SCTP related functions. The example layout 200 of FIG. 2 can be employed in either the SCTP client 101 or the SCTP server 102, or any other node that communicates using SCTP. An SCTP implementation or function 201 (also referred to as a SCTP stack 201) resides between a SCTP application (e.g., SCTP user application) 202 and a communication protocol implementation or function 203, such as an Internet Protocol (IP) implementation or function 203, which provides a protocol connection to the network 103.

Within the SCTP stack 201, a DTLS in SCTP function 220 provides a DTLS encryption operation. The DTLS in SCTP function 220 commonly resides between a SCTP chunk processing function 210, that provides for SCTP chunk processing, and a SCTP packet processing function 230, that provides the basic SCTP packet processing for transmitting and receiving SCTP packets. In some embodiments, a SCTP header processing function 240 is present to provide header operation (attachment or removal of headers) related to DTLS payloads, which is further described below.

The DTLS in SCTP function 220 provides DTLS encryption (shown by function block 221) for protecting transmitted and received SCTP packets. The initialization of the DTLS security, provided by DTLS in SCTP initialization function 211, is part of the SCTP chunk processing which is provided by the SCTP chunk processing function 210. The initialization is used in the initial SCTP association handshake (e.g., INIT chunk processing) to ensure backwards compatibility to existing SCTP operation. To provide full functionality, DTLS in SCTP is capable of being securely initialized to protect the content of transmitted SCTP packets after handshake between the peers, and be capable of being rekeyed and re-authenticated on a periodic basis.

When operating as a sender, the SCTP stack 201 receives a message from the SCTP application 202 and processes the message for SCTP transmission using DTLS encryption, and forwards the DTLS encrypted SCTP packet to the IP function 203 for transmission. Note that, although IP transmission is mentioned in this example, in some embodiments IP function 203 can be configured to employ other communication protocols for transmission or reception of the DTLS encrypted SCTP packets. For example in some embodiments, User Datagram Protocol (UDP) can be used to provide UDP encapsulation of the SCTP packets.

When operating as a recipient of a SCTP packet, the SCTP stack operates in reverse by receiving a SCTP packet at the IP function 203 and operates through the SCTP stack in reverse by processing the received SCTP packet (SCTP packet processing function 230), extracting and decrypting the DTLS encrypted payload to provide a SCTP chunk (DTLS in SCTP function 220), and processing the recovered SCTP chunk (SCTP chunk processing function 210) for forwarding to a SCTP application 202 at the receiver end. Hence, an upper layer of the SCTP stack 201 resides near the SCTP application 202, for both the sender and the recipient, and a lower layer of the SCTP stack 201 resides near the IP function 203, for both the sender and the recipient.

The SCTP header processing function 240 may be present in some embodiments to attach a header (for sender), or remove a header (for recipient). The SCTP header processing function 240 can be a separate function or can be incorporated as part of the DTLS in SCTP function 220.

In some embodiments, DTLS in SCTP implementation may use a header to identify a presence of a DTLS payload in the SCTP packet to inform the recipient the presence of a DTLS payload that will require DTLS decryption before SCTP chunk processing. In some embodiments, this information regarding the need for DTLS decryption may be incorporated in a common SCTP header used with SCTP transmissions. In some embodiments, this information can be presented in a new SCTP chunk header. The new SCTP chunk header can be used alone or combined with the SCTP common header. An example of a SCTP chunk header is further described below in reference to FIG. 5.

In some embodiments, the sender and the recipient may have earlier communicated regarding the use of DTLS encryption in SCTP communication, or the sender and the receiver may be preconfigured to have the knowledge, such that a specialized header may not be needed to be conveyed with each SCTP packet containing the DTLS encrypted payload.

In some embodiments, the functions of the SCTP stack 201 may be integrated within a function, module, program (e.g., kernel of program or an operating system), such that the encrypting to generate the DTLS record (or decrypting) is integrated as part of the SCTP processing to generate (or process) the SCTP packet. Thus, in those instances the DTLS encrypted (or decrypted) record is integrated as part of the SCTP processing between a SCTP upper layer for chunk creation (or recovery) and a SCTP lower layer for generation (or reception) of the SCTP packet for transmission (or reception).

In some embodiments, one or more functions of the SCTP stack 201 may not be integrated with other function(s) of the SCTP stack 201. For example, one or more functions may reside at another location, such as when functions operate within a cloud environment.

Furthermore, the DTLS record described herein can pertain to any type of communication between two network nodes. Thus, the DTLS record can include SCTP association signaling, data, or both SCTP association signaling and data, as well as other information.

Furthermore, in some embodiments, each DTLS encryption is performed on each set of SCTP chunks in an order produced SCTP packets will be transmitted, such that DTLS records created have a monotonically increasing sequence number in relation to transmission order.

Figure 3:
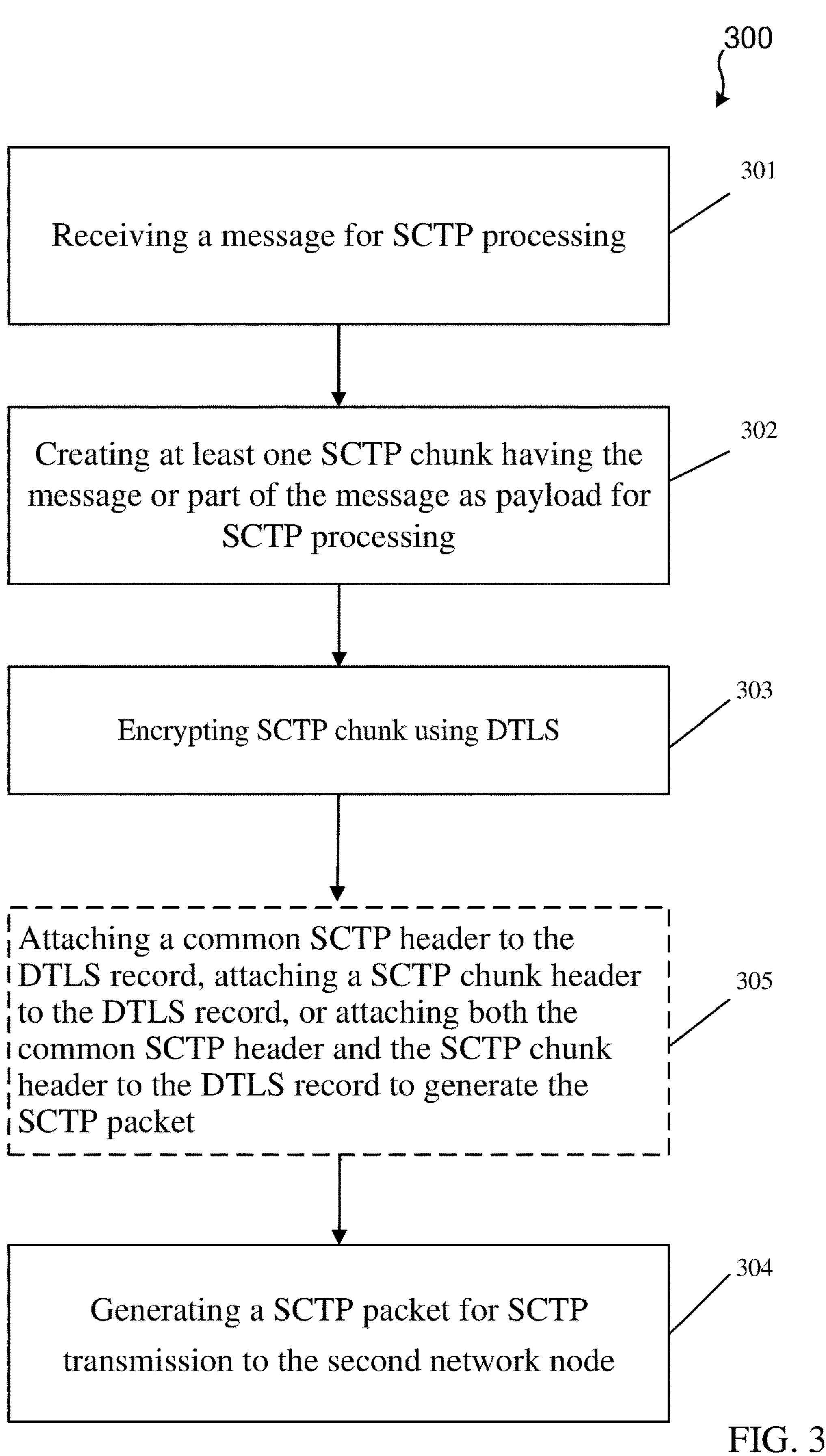
FIG. 3 shows a flow diagram for transmitting a SCTP packet having a SCTP chunk DTLS encrypted in accordance with some embodiments of the present disclosure.

FIG. 3 shows a method 300 for transmitting a SCTP packet having a SCTP chunk DTLS encrypted from a first network node. The SCTP stack 201 performs the method 300. At operation 301, the SCTP chunk processing function 210 provides for receiving a message for SCTP processing from the SCTP application 202 and creating at least one SCTP chunk having the message or part of the message as payload for SCTP processing at operation 302. At operation 303, the DTLS in SCTP function 220 provides for encrypting the at least one SCTP chunk using DTLS encryption to generate a DTLS record of the at least one SCTP chunk. At operation 304, the SCTP packet processing function 230 provides for generating a SCTP packet for SCTP transmission to a second network node.

When employing a specialized header, at operation 305, the SCTP header processing function 240 attaches the header. Depending on the embodiment implemented, the SCTP header processing function 240 provides for attaching a SCTP chunk header to the DTLS record to identify the at least one SCTP chunk as DTLS encrypted; attaching a common SCTP header to the DTLS record to generate the SCTP packet for SCTP transmission to the second network node; or attaching both a common SCTP header to the SCTP chunk header and the DTLS record to generate the SCTP packet for SCTP transmission to the second network node.

Figure 4:
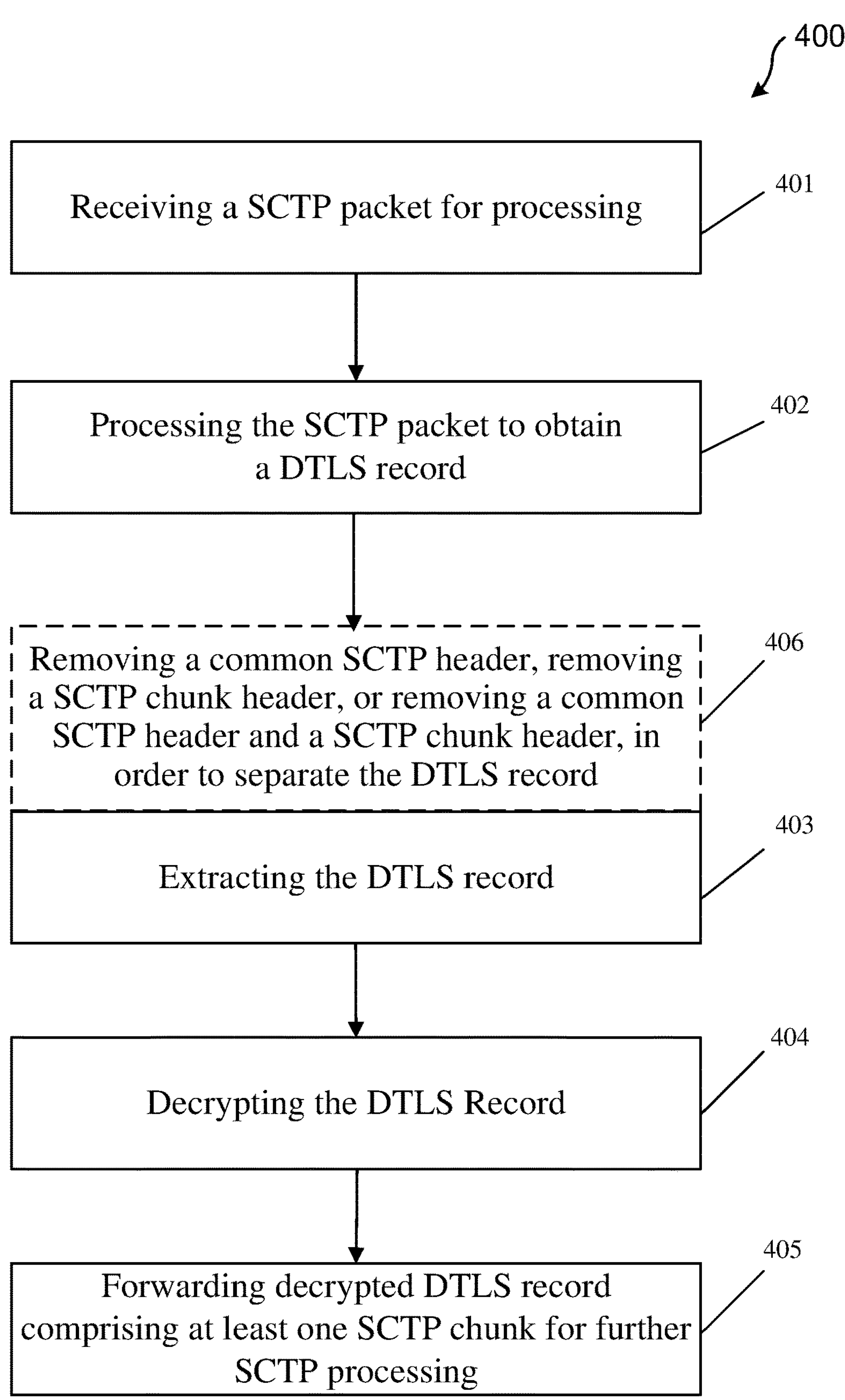
FIG. 4 shows a method for decrypting a message, transmitted securely from a first network node, which is received at a second network node in accordance with some embodiments of the present disclosure.

FIG. 4 shows a method 400 for decrypting a message, transmitted securely from a first network node, which is received at a second network node. At operation 401, the SCTP packet processing function 230 provides for receiving a SCTP packet for processing. At operation 402, the DTLS in SCTP function 220 provides for processing the SCTP packet to obtain a DTLS record. In some embodiments, to obtain the DTLS record is performed by identifying the SCTP chunk containing the DTLS record. In some embodiments where a header is used, at operation 406, the SCTP header processing function 240 provides for extracting the DTLS record by removing a common SCTP header in order to separate the DTLS record which is encrypted; removing a SCTP chunk header in order to separate the DTLS record which is encrypted; or removing a common SCTP header and a SCTP chunk header in order to separate the DTLS record which is encrypted.

At operation 403, DTLS in SCTP function 220 provides for extracting the DTLS record and at operation 404 provides for decrypting the DTLS record. At operation 405, the SCTP chunk processing function 210 provides for forwarding decrypted DTLS record having at least one SCTP chunk for further SCTP processing.

As noted above as to encrypting, the SCTP stack 201 at the second network node can be integrated as a unit where the decrypting the DTLS record is integrated as part of SCTP processing; and in some instances, where the decrypting the DTLS record is integrated as part of SCTP processing between a SCTP lower layer for extraction of the SCTP packet for reception and a SCTP upper layer for chunk processing.

In some embodiments, one or more functions of the SCTP stack 201 of the second network node may not be integrated with other function(s) of the SCTP stack 201. For example, one or more functions may reside at another location, such as when functions operate within a cloud environment.

Furthermore, the DTLS record described herein can pertain to any type of communication between two network nodes. Thus, the DTLS record received can include SCTP association signaling, data, or both SCTP association signaling and data, as well as other information.

Furthermore, in some embodiments, each DTLS encryption is performed on each set of SCTP chunks in an order produced SCTP packets will be transmitted, such that DTLS records received should have a monotonically increasing sequence number in relation to reception order.

Figure 5:
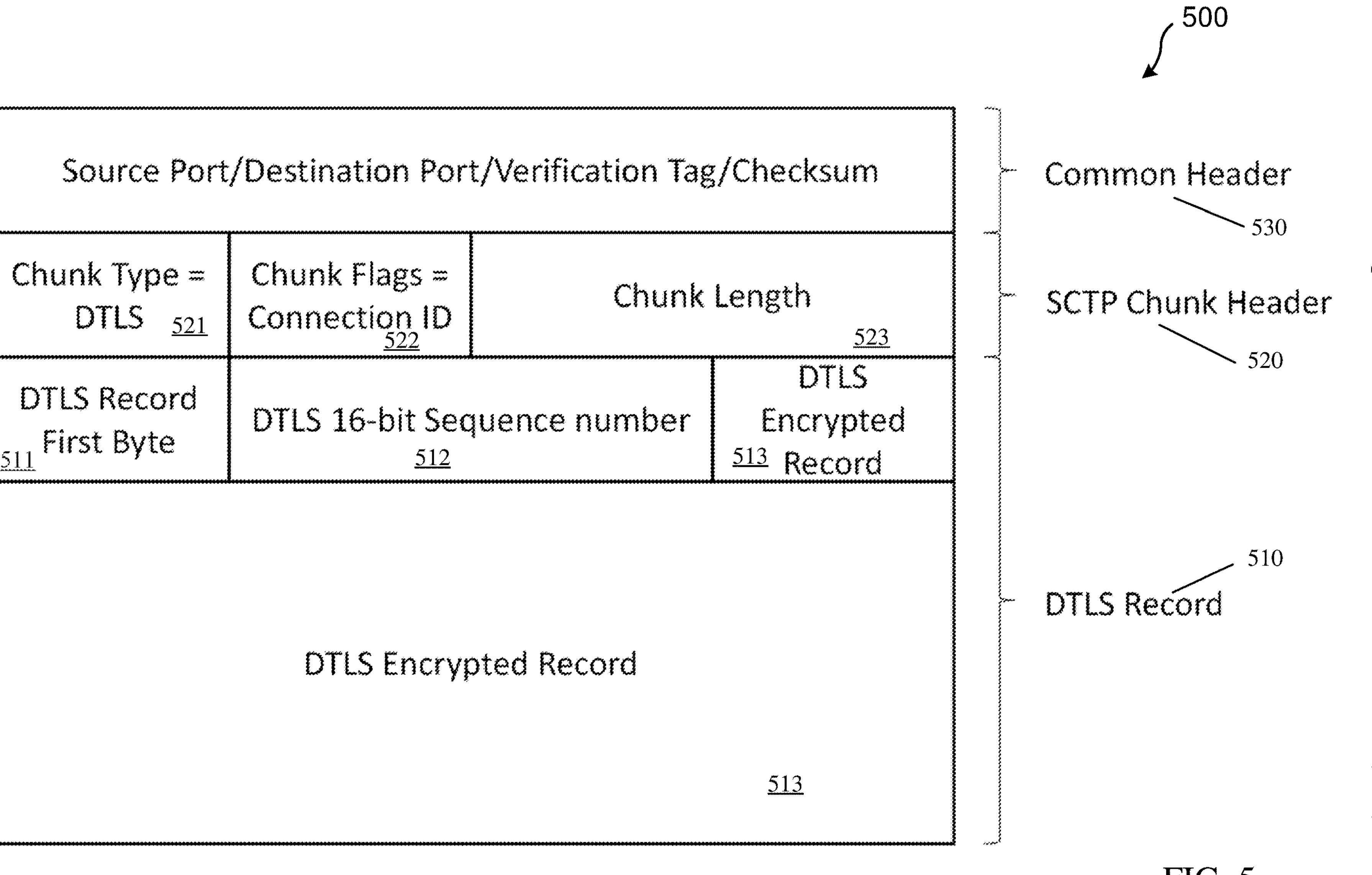
FIG. 5 shows one example of a header with a DTLS record in accordance with some embodiments of the present disclosure.

FIG. 5 shows one example of a header with a DTLS record. FIG. 5 shows an SCTP chunk 500 having a DTLS record 510. The DTLS record 510 includes the DTLS encrypted SCTP chunk having the message or part of the message as payload 513 (DTLS encrypted payload). In some embodiments, the DTLS record 510 can include information related to DTLS record first byte 511, a DTLS sequence number 512 that contains the monotonically increasing sequence number to identify the afore-mentioned sequence of transmission. In the illustrated example, this sequence number is shown as a 16-bit sequence number.

The SCTP chunk header, when used, is shown as SCTP chunk header 520. The SCTP chunk header 520 in the example includes a Chunk Type field 521, Chunk Flags field 522 and/or Chunk Length field 523. The Chunk Type field 521 can identify if the SCTP chunk contains, or does not contain, the DTLS encrypted payload 513. The Chunks Flags field 522 can contain a Connection Identifier (ID) to identify the communication connection, which use is further described below in rekeying and/or reauthenticating an existing SCTP connection. The Chunk Length Field 523 can contain the length of the SCTP chunk. Thus, in some embodiments, the SCTP chunk header 520 can include information related to type of chunk, connection identifier and/or chunk length to identify the DTLS record.

As a further example, in some embodiments, the Chunk Types are encoded such that the highest-order 2 bits specify the action that is taken if the processing endpoint does not recognize the Chunk Type.

In some embodiments, the Chunk Flags are 8-bits, in which the usage of these bits depends on the Chunk Type, as given by the Chunk Type field 521. In some instances, unless otherwise specified, they are set to 0 on transmit and are ignored on receipt.

In some instances, the Chunk Length is 16 bits. This value represents the size of the chunk in bytes, including the Chunk Type, Chunk Flags, Chunk Length, and Chunk Value fields. Therefore, if the Chunk Value field is zero-length, the Length field will be set to 4. The Chunk Length field does not count any chunk padding. However, it does include any padding of variable-length parameters other than the last parameter in the chunk. Some embodiments can have an implementation expected to accept the chunk, whether or not the final padding has been included in the Chunk Length.

In some embodiments, a Chunk Value field can be included to contains the actual information to be transferred in the chunk. The usage and format of this field is dependent on the Chunk Type.

In some embodiments, the total length of a chunk (including Type, Length, and Value fields) is set to a multiple of 4 bytes. If the length of the chunk is not a multiple of 4 bytes, the sender can pad the chunk with all zero bytes, and this padding is not included in the Chunk Length field. The sender does not pad with more than 3 bytes. The receiver then ignores the padding bytes.

The SCTP common header 530, when used, is attached to the SCTP chunk header 520 and the DTLS record 510. The SCTP common header 530 includes information such as source port, destination port, verification tag, and checksum for the packet. The SCTP common header 530 may be used with the DTLS record 510, even in those instances where the SCTP chunk header 520 is not utilized.

Initialization

Figure 6:
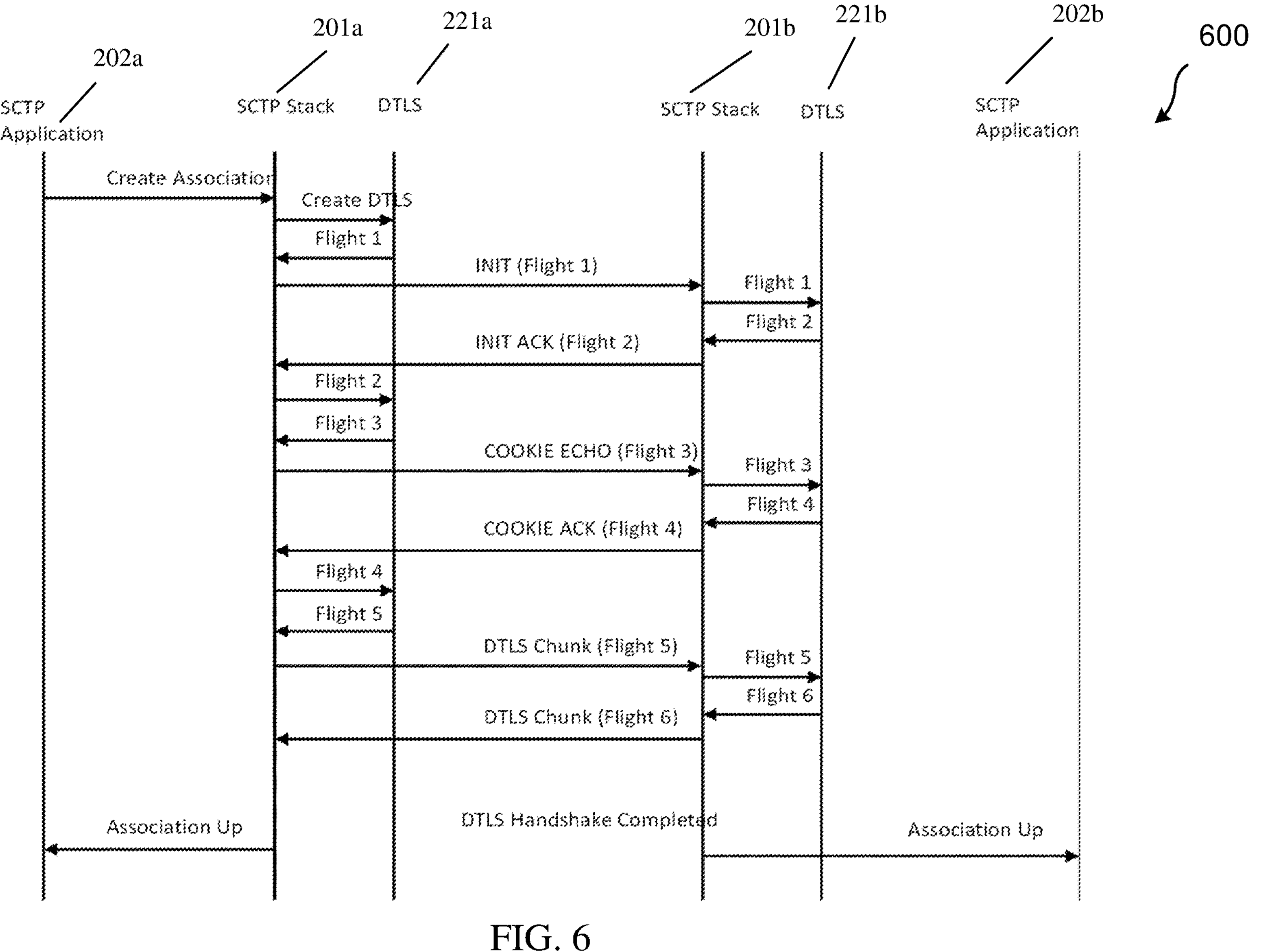
FIG. 6 shows an association setup between two SCTP network nodes in accordance with some embodiments of the present disclosure.

FIG. 6 shows an association setup 600 between two SCTP network nodes (e.g., first network node and second network node). The two network nodes can be the SCTP client 101 and SCTP server 102, two SCTP peer nodes, or any two other SCTP communicating nodes. For explanatory purposes, the examples herein use the term first network node as the initiator (creator) of the association or sender, while the other network node is referred to as the second network node. The first network node is at the left portion of the diagram and the second network node is at the right portion of the diagram. Both network nodes include the earlier described SCTP application 202 and the SCTP stack 201, which includes the DTLS encryption/decryption function 221. Suffixes "a" and "b" differentiate the sender and the recipient ("a" for the first network node and "b" for the second network node).

To establish a new SCTP association, a SCTP INIT (initialization) signaling (shown as Flight 1) is sent in order for the SCTP client 101 (or SCTP server 102) to establish an association. A Create Association signaling from the SCTP application 202*a* is received by the SCTP stack 201*a*. To indicate both its support of DTLS in SCTP and optionally carry the DTLS handshake, the SCTP sender includes a new INIT and INIT-ACK (acknowledged) parameter (e.g., DTLS Handshake parameter) which is a request to use DTLS in SCTP security. In addition, it may contain one DTLS handshake message in Flight 1. If the DTLS handshake message can be included depends on if it will fit, such that the resulting SCTP packet does not exceed the IP payload Maximum Transmission Unit (MTU). The SCTP stack 201*b* of the recipient responds by including the DTLS handshake parameter in the INIT ACK, if it supports DTLS in SCTP, with zero or one DTLS handshake messages, depending on if it fits and one was included in the INIT. Thus, the INIT ACK can carry the second flight (Flight 2) of the DTLS handshake.

A new SCTP chunk with DTLS encryption (e.g., DTLS Chunk) is also defined that is used to carry DTLS messages as well as DTLS records with protected data. These chunks can be included in the Cookie Echo and Cookie acknowledgement (ACK) packets or in its own SCTP packets with only the DTLS chunks to complete the DTLS handshake. The Cookie Echo and Cookie ACK are shown in Flight 3 and Flight 4, respectively. In cases where the DTLS handshake message is larger than the MTU, the DTLS implementation can fragment the message into multiple parts, each part sent in its own SCTP packet as the payload of the DTLS chunk. FIG. 6 depicts these flights as Flights 1-4, where Flights 1-4 are limited to what can fit in these SCTP handshake packets within the MTU. Additional DTLS chunks can be sent in additional flights, shown as Flight 5 and Flight 6. Flights 5-6 and any additionally needed flights can be of multiple SCTP packets, each with a DTLS chunk carrying a fragment of the complete DTLS message. When the DTLS handshake is completed and the API Application notified (Association Up), the association setup is completed between the two SCTP applications 202*a* and 202*b*.

In some embodiments, the DTLS in SCTP function 220 may be required to identify multiple DTLS connections, as multiple DTLS connections can be used, if there is a need for rekeying, reauthentication, or transfer of revocation information. This can be achieved by using the DTLS connection ID feature of DTLS 221 and having it included in the DTLS record 510. Or an alternative embodiment is to include part of the DTLS connection ID generated by 221 in the DTLS Chunk flags field 522, when the SCTP Chunk header 520 is used, which have the advantage of saving up to 1 byte overhead. Or an alternative is to include a connection ID set by the DTLS in SCTP function 220 in the DTLS chunk's chunk flags field 522. The advantage of this later embodiment is that it requires less of the DTLS implementation. When the DTLS security context is in place and the other party has been authenticated the limitation to not transfer DATA chunks containing SCTP application 202 user message is removed, and from this point until the SCTP association is shutdown or the DTLS connection is replaced by a new one for rekeying, all SCTP chunks will be protected by the established DTLS connection. At this point the procedure enters what is below referred to as protected operation mode.

Per Packet Protection in Transmitter and Receiver

Figure 7A:
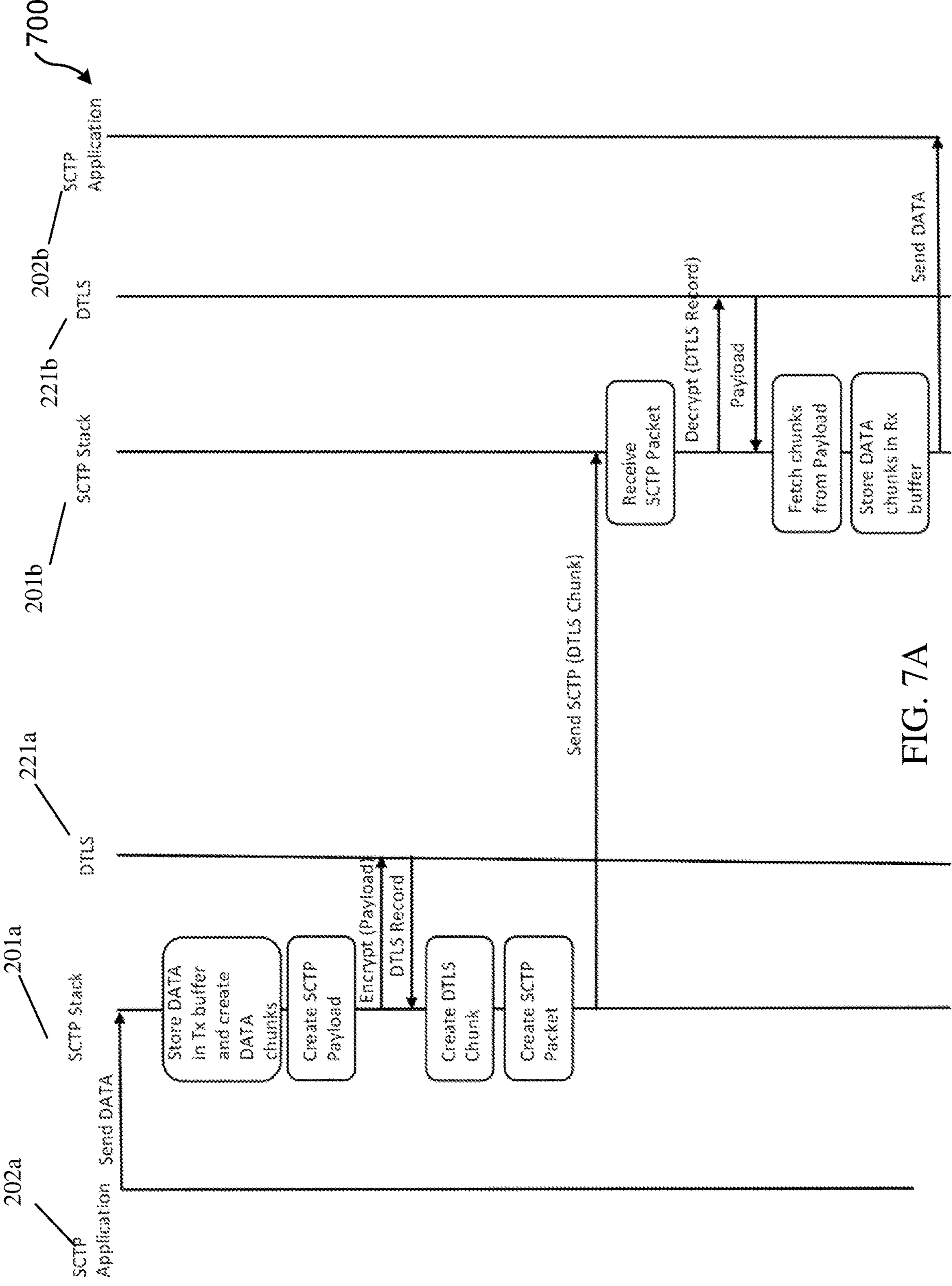
FIGS. 7A & 7B show data transfer operations between two SCTP network nodes once association setup has been established in accordance with some embodiments of the present disclosure.
Figure 7B:
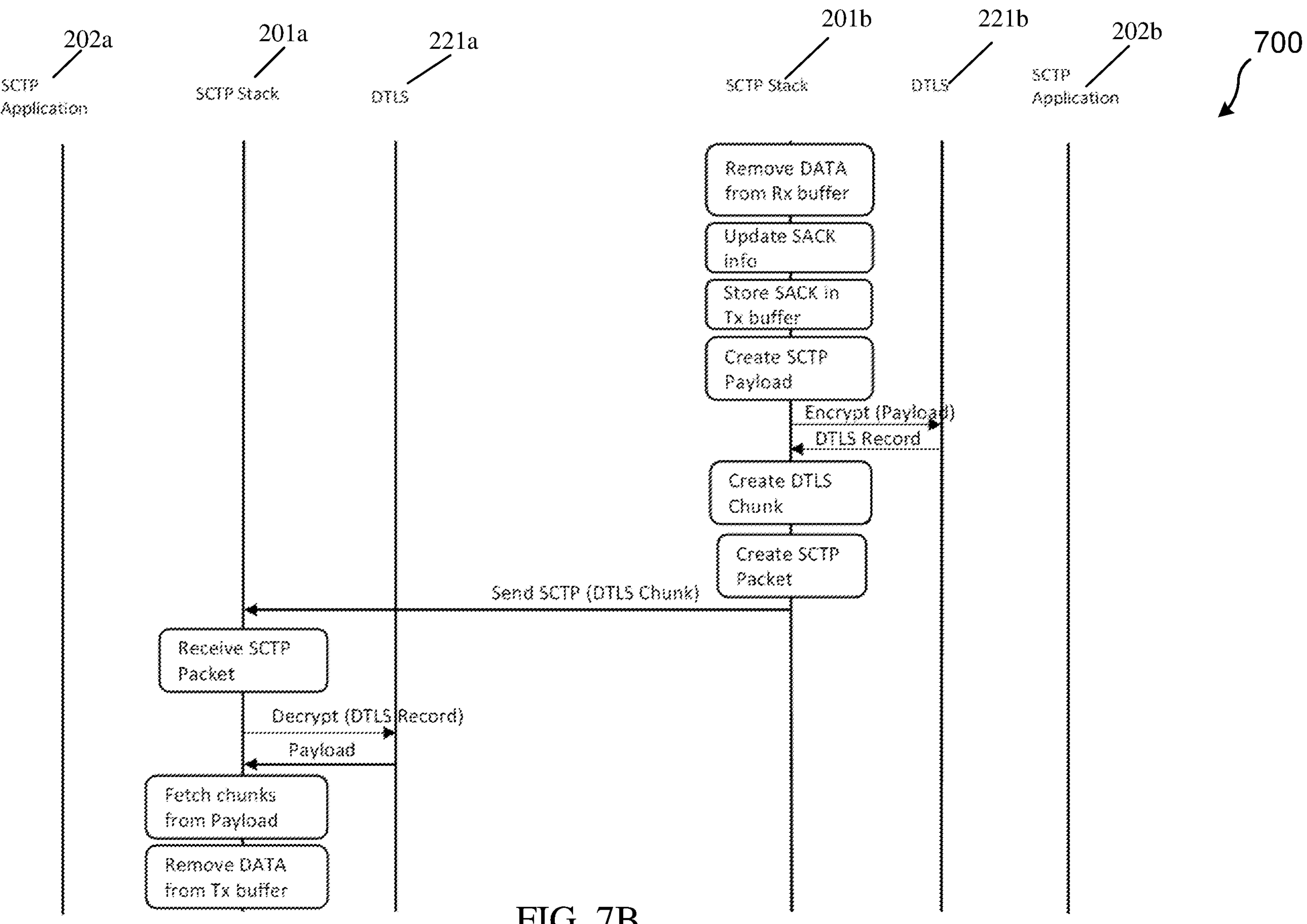

FIGS. 7A and 7B show data transfer operations 700 between two SCTP network nodes (e.g., first network node and second network node) once association setup has been established. FIG. 7A is the top portion of the diagram and FIG. 7B is the bottom portion of the diagram, such that the bottom of FIG. 7A connect to the top of FIG. 7B. The per packet protection in the protected operation mode works like the following when transmitting an SCTP packet.

The known IP MTU is used to calculate the actual MTU for the SCTP chunks. This will be the IP MTU minus IP headers (including extension headers in IPv6), the SCTP common header, and the DTLS chunk and record overhead (including authentication tag). This calculation normally is done again each time any of the parameters have changed, such as the IP MTU value, and the new values provided to DTLS encryption, as well as used for the available space for SCTP chunks.

The SCTP stack 201 creates the SCTP chunks to be transmitted in the next SCTP packet and hands them to the DTLS in SCTP function 220. The DTLS in SCTP function 220 takes this data and runs DTLS encryption protection operation to encrypt and integrity protect the data with an authentication tag, producing a DTLS record 510. This DTLS record 510 is then encapsulated in the DTLS chunk, for example using the SCTP chunk header 520 shown in FIG. 5. This DTLS Chunk is then given to the lower layer SCTP transmission function, such as SCTP header processing function 240 or SCTP packet processing function 230, that prepends the SCTP common header 530 and calculate the cyclic redundancy check (CRC) for this SCTP packet with the DTLS record. Then this packet is transmitted by the IP (or UDP) function 203 for transmission to the peer. FIG. 7A illustrates the above described example from "Send DATA" to "Send SCTP (DTLS chunk)" portion of the operations 700.

When receiving an SCTP packet when in DTLS protected mode, the SCTP lower layer finds the right SCTP association context based on the verification tag (such as that of the SCTP common header) and port numbers and verifies the SCTP packet using the CRC. Then forwards the SCTP chunk having the DTLS record to the DTLS in SCTP function 220 which extracts the DTLS record 510. The DTLS record 510 is then given to DTLS encrypt/decrypt function 221 for decryption and integrity verification in the security context given by the identified DTLS connection as scoped by this SCTP association context. The DTLS connection can, as mentioned above, can be identified either by DTLS connection ID feature, or relying on a DTLS in SCTP mechanism depending on the embodiment. If the packet fails replay protection or integrity verification the DTLS chunk is discarded, which will be equivalent to a network drop of the SCTP packet. If the packet passes integrity verification and decryption by DTLS the set of included SCTP chunks are passed to SCTP chunk processing function 210.

For particular embodiments, operations can differ. For DTLS 1.2, the DTLS 1.2 header and the Chunk header are very similar. For a DATA chunk, which has chunk type=0 is not transmitted unprotected in DTLS in SCTP. After DTLS in STCP has been negotiated (e.g., after the combined SCTP+DTLS handshake) the DTLS records with type=0 can be sent without the DTLS chunk header. For DTLS messages with type different from 0, they will be encapsulated in a SCTP DTLS Chunk to ensure demultiplexing. Note, this only work for DTLS 1.2, and not for DTLS 1.3, as DTLS 1.3 skips the content type field in the DTLS record header after the handshake has been completed. Some embodiments can reduce the overhead but works with all DTLS versions to remove the DTLS length field, and instead reconstruct it based on the CHUNK length field, and move an appropriate DTLS header byte into the chunk flags field, like the first byte of the DTLS record or the DTLS connection ID.

The header-DTLS record illustration of FIG. 5 shows a potential compact embodiment of the DTLS chunk that is compatible with DTLS 1.3. The DTLS chunk flags field 522 encodes the connection ID identifying the particular DTLS connection this chunk is targeting. This can either be DTLS in SCTP handled connection ID or moving the DTLS record's field for a single byte connection ID. The chunk length field 523 gives the length of the DTLS chunk and allows determination of the DTLS record, thus the DTLS record's length field is not needed. The chunk payload field contains the remaining DTLS record header, including the first byte 511 with the flag bits and the 2-bit epoch, and the DTLS sequence number 512, here as a 16-bit field. These header bytes are then followed by the encrypted record 513.

An alternative embodiment is that some chunk types are not protected. This might be agreed beforehand by the two endpoints or negotiated in the SCTP handshake.

Returning to FIGS. 7A and 7B, the operations show the sender's SCTP message transmitted from the first network node to the second network node and having it be acknowledged as received. The SCTP application 202*a* makes a call to the SCTP stack 201*a* to send its user message (DATA). The SCTP stack 201*a* stores the SCTP application's data in its transmission buffer (Tx) and creates the DATA chunk and possible additional chunks to be included in an SCTP packet. These chunks are then protected by DTLS and the DTLS record encapsulated in a DTLS chunk using the SCTP chunk header 520. Then, the SCTP common header 530 is added creating the SCTP packet, which is then sent to the peer (e.g., second network node). Some embodiments may use a different header arrangement, or no header arrangement, as described above.

Upon reception of the SCTP packet the SCTP association is found, and the CRC verified. Then the DTLS chunk is decapsulated to extract the DTLS record, and the DTLS session is identified from the DTLS connection ID, allowing the right security context to be used to decrypt and verify the DTLS record's payload. The payload with the SCTP chunks, including the DATA chunk is then processed by the SCTP stack 201*b*. The DATA chunk's content is stored in the receiver buffer (Rx), and if complete up to this point, can be released to the receiving SCTP application 202*b*.

As the SCTP packet with the user application's data has been received it will be acknowledged. As illustrated in FIG. 7B, the SCTP stack 201*b* updates its Selective Acknowledgement (SACK) information when the DATA chunk was received, and a SACK is sent when decided by the SACK sending policy in the SCTP stack 201. When the SACK chunk has been produced, it and potentially other chunks are provided to DTLS as payload to be protected. The resulting DTLS record is encapsulated in a DTLS chunk, and then a SCTP packet created from it, that is sent back to the DATA sender (e.g., first network node). The DATA sender receives the SCTP packet, verify the CRC and find the SCTP association and decapsulate the DTLS Chunk. Then, send the DTLS record for decryption and integrity verification to the identified DTLS connection. The DTLS payload containing the SACK chunk will then be processed by the SCTP stack 201*a*. Once determining that the data (DATA) has been received, the DATA can be removed from the transmission buffer (Tx). The data received can be removed from the receiver buffer at suitable point after having delivered it to the SCTP application 202*a*.

Figure 8:
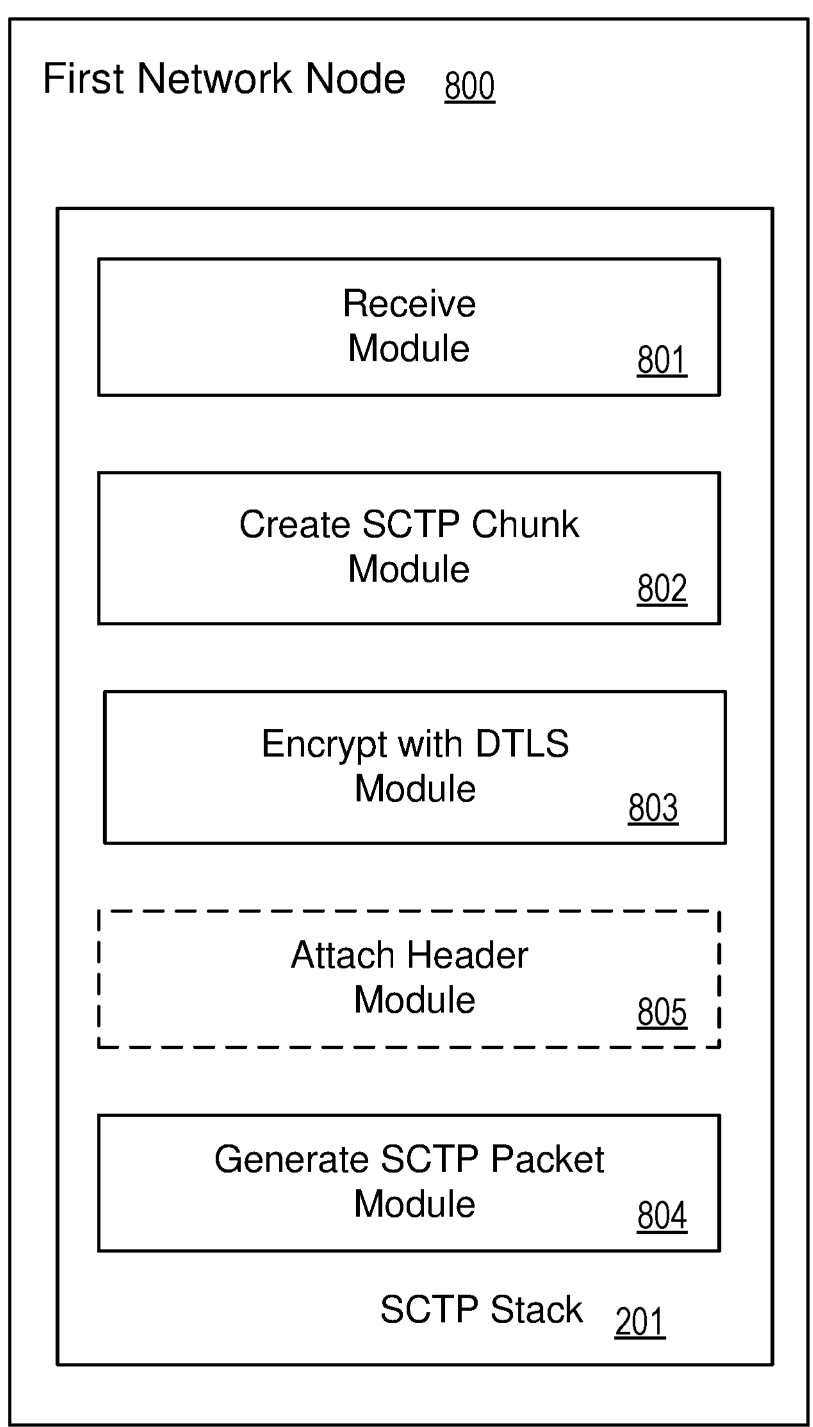
FIG. 8 shows a first network node containing the SCTP stack in accordance with some embodiments of the present disclosure.

FIG. 8 shows a first network node 800 containing the SCTP stack 201 that corresponds to the SCTP stack 201*a* of FIGS. 6, 7A and 7B. The first network node 800 can implement the functions of the method 300 of FIG. 3, as well as the various embodiments described in the disclosure. As shown, a Receive module 801 can perform operations corresponding to the operation 301. A Create SCTP Chunk module 802 can perform operations corresponding to the operation 302. An Encrypt with DTLS module 803 can perform operations corresponding to the operation 303. An Attach Header module 805 can perform operations corresponding to the operation 305. A Generate SCTP Packet module 804 can perform operations corresponding to the operation 304.

In some embodiments, the modules 801-805 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the first network node 800 are implemented in software. In other embodiments, the modules of the network node 800 are implemented in hardware. In further embodiments, the modules of the network node 800 are implemented in a combination of hardware and software. In some embodiments, the computer program can be provided on a carrier, where the carrier is one of an electronic signal, optical signal, radio signal or computer storage medium.

Figure 9:
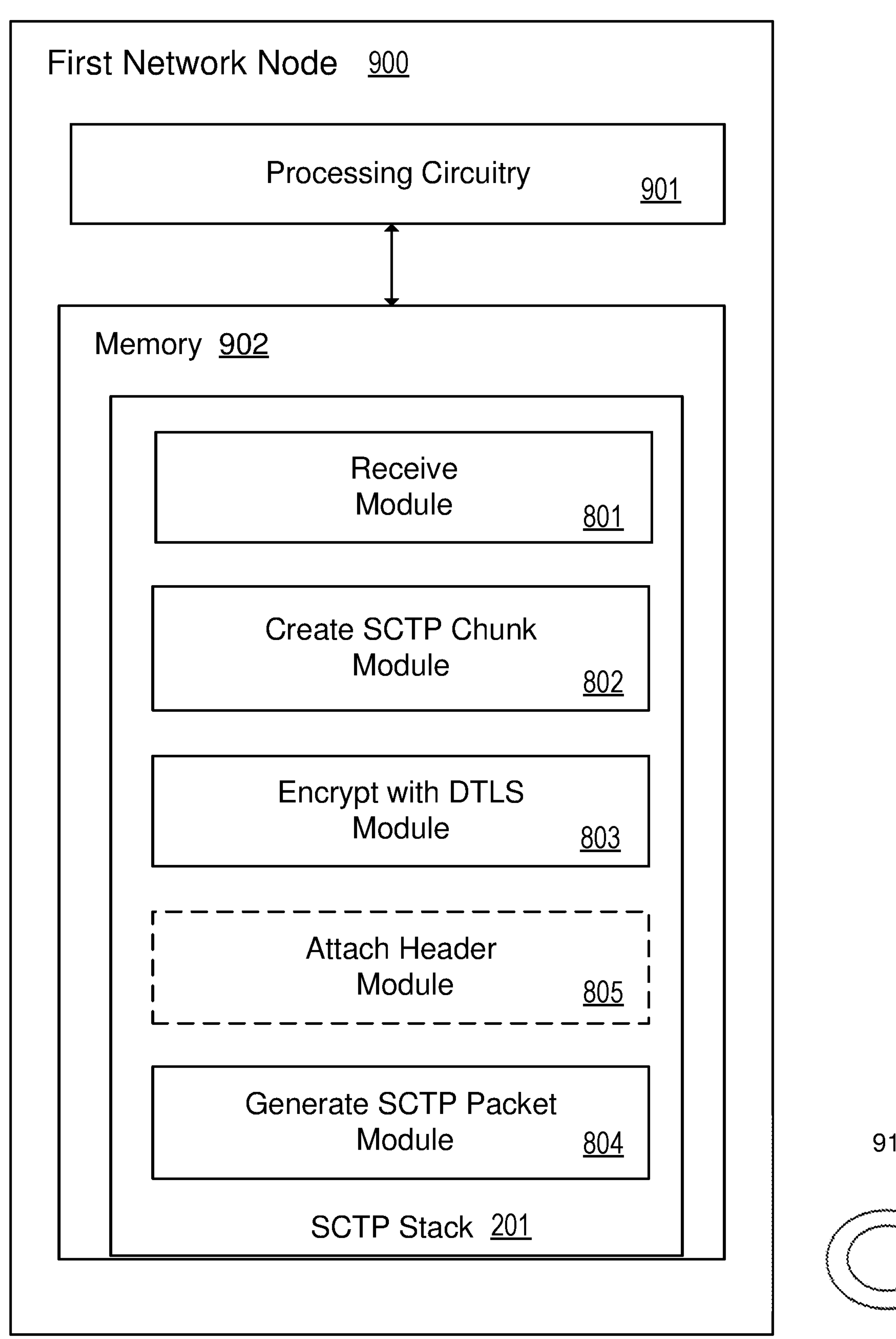
FIG. 9 shows another first network node containing the SCTP stack in accordance with some embodiments of the present disclosure.

FIG. 9 shows a first network node 900 containing the SCTP stack 201 that corresponds to the SCTP stack 201*a* of FIGS. 6, 7A and 7B. In some embodiments, the first network node 900 can implement the functions of the method 300 of FIG. 3, as well as the various embodiments described in the disclosure. In some embodiments, the network node 900 can be configured to implement the modules 801-805 of FIG. 8, wherein the instructions of the computer program for providing the functions of modules 801-805 reside in a memory 902.

The first network node comprises processing circuitry (such as one or more processors) 901 and a non-transitory machine-readable medium, such as the memory 902. The processing circuitry 901 provides the processing capability. The memory 902 can store instructions which, when executed by the processing circuitry 901, are capable of configuring the first network node 900 to perform the methods described in the present disclosure. The memory can be a computer readable storage medium, such as, but not limited to, any type of disk 910, including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Figure 10:
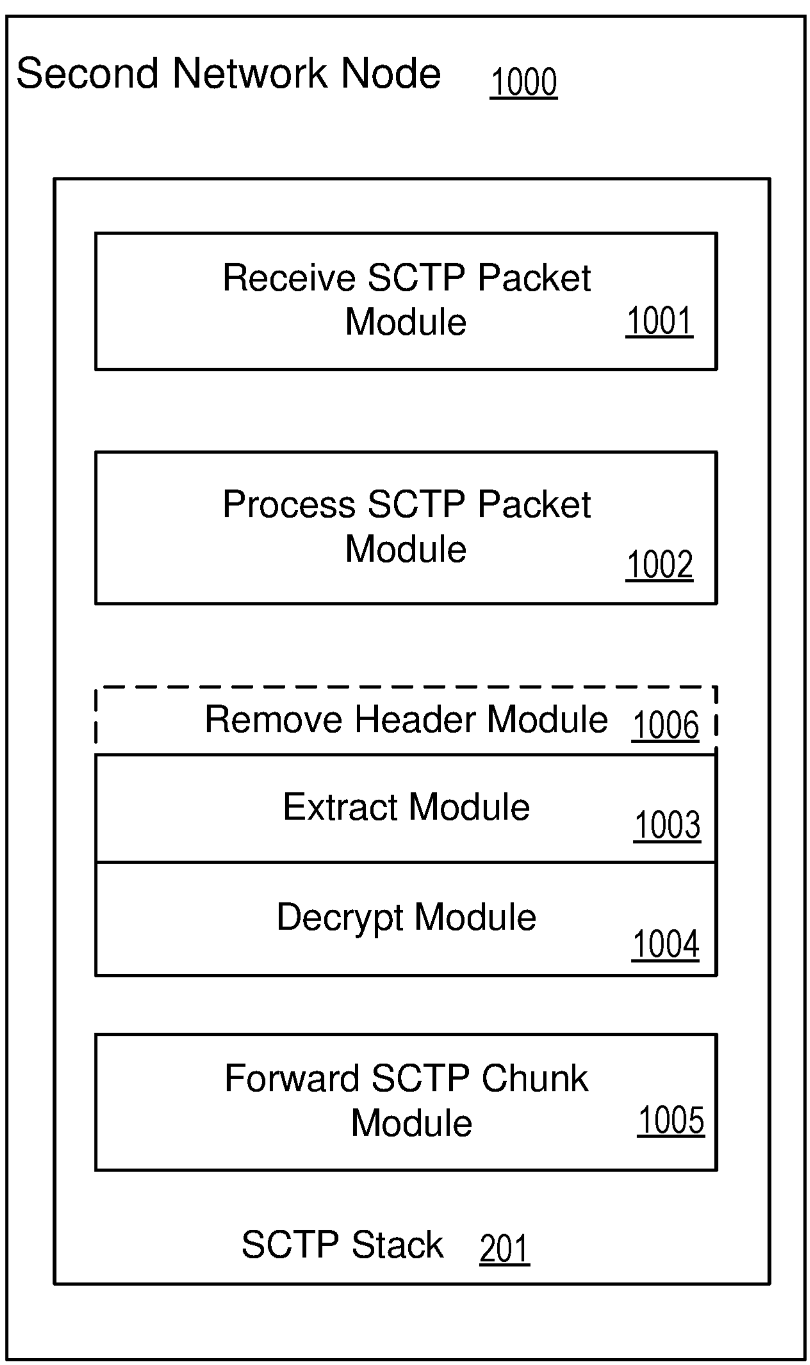
FIG. 10 shows a second network node containing the SCTP stack in accordance with some embodiments of the present disclosure.

FIG. 10 shows a second network node 1000 containing the SCTP stack 201 that corresponds to the SCTP stack 201*b* of FIGS. 6, 7A and 7B. The second network node 1000 can implement the functions of the method 400 of FIG. 4, as well as the various embodiments described in the disclosure. As shown, a Receive SCTP Packet module 1001 can perform operations corresponding to the operation 401. A Process SCTP Packet module 1002 can perform operations corresponding to the operation 402. An Extract module 1003 can perform operations corresponding to the operation 403. A Decrypt module 1004 can perform operations corresponding to the operation 404. A forward SCTP Chunk module 1005 can perform operations corresponding to the operation 405. When present, a Remove Header module 1006 can perform operations corresponding to the operation 406.

In some embodiments, the modules 1001-1006 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the second network node 1000 are implemented in software. In other embodiments, the modules of the second network node 1000 are implemented in hardware. In further embodiments, the modules of the second network node 1000 are implemented in a combination of hardware and software. In some embodiments, the computer program can be provided on a carrier, where the carrier is one of an electronic signal, optical signal, radio signal or computer storage medium.

Figure 11:
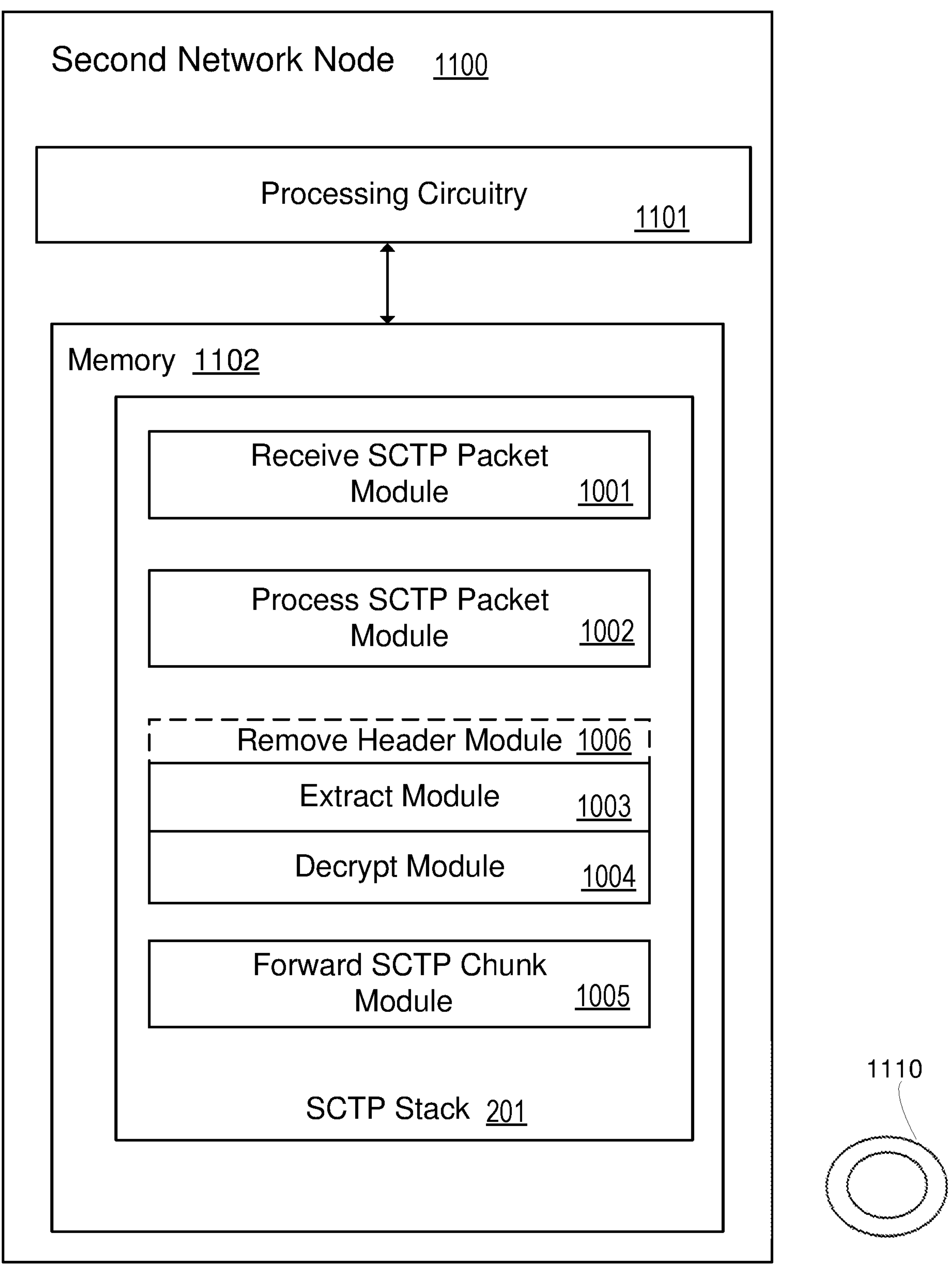
FIG. 11 shows another second network node containing the SCTP stack in accordance with some embodiments of the present disclosure.

FIG. 11 shows a second network node 1100 containing the SCTP stack 201 that corresponds to the SCTP stack 201*b* of FIGS. 6, 7A and 7B. In some embodiments, the second network node 1100 can implement the functions of the method 400 of FIG. 4, as well as the various embodiments described in the disclosure. In some embodiments, the second network node 1100 can be configured to implement the modules 1001-1006 of FIG. 10, wherein the instructions of the computer program for providing the functions of modules 1001-1006 reside in a memory 1102.

The second network node comprises processing circuitry (such as one or more processors) 1101 and a non-transitory machine-readable medium, such as the memory 1102. The processing circuitry 1101 provides the processing capability. The memory 1102 can store instructions which, when executed by the processing circuitry 1101, are capable of configuring the second network node 1100 to perform the methods described in the present disclosure. The memory can be a computer readable storage medium, such as, but not limited to, any type of disk 1110, including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

New DTLS Connection for Rekeying and Re-Authentication (or Mutual Re-Authorization)

Before a current security context runs out of key lifetime or for other reasons a need to rekey exists, a new DTLS connection is established under some embodiments of this disclosure. Key lifetime can be based on the number of Authenticated Encryption with Associated Data (AEAD) invocations, the amount of time the key has been used (e.g., 1 hour, etc.), the amount of data protected (e.g., 100 GB, etc.), certificate expiry, or a need for fresh revocation information. This is done by having the DTLS in SCTP initiate a new DTLS handshake with the peer. This process is happening in parallel to any ongoing normal SCTP transmissions. An alternative embodiment is to include the new DTLS handshake together with zero or more other SCTP chunks and protect this handshake message (or fragment) with the existing DTLS connection. Thus, creating a cryptographic binding to the existing DTLS connection. When the new DTLS handshake is completed and has been verified to authenticate to the same peer as before, the used security context (DTLS connection) in the protection operation is switched from the old to the new. The receiver of the packets will determine which security context to use from the included DTLS connection ID. Or in the alternative embodiment when the DTLS chunk contains an DTLS connection identifier, rather than the DTLS record, that is used to identify the right DTLS connection context.

Figure 12:
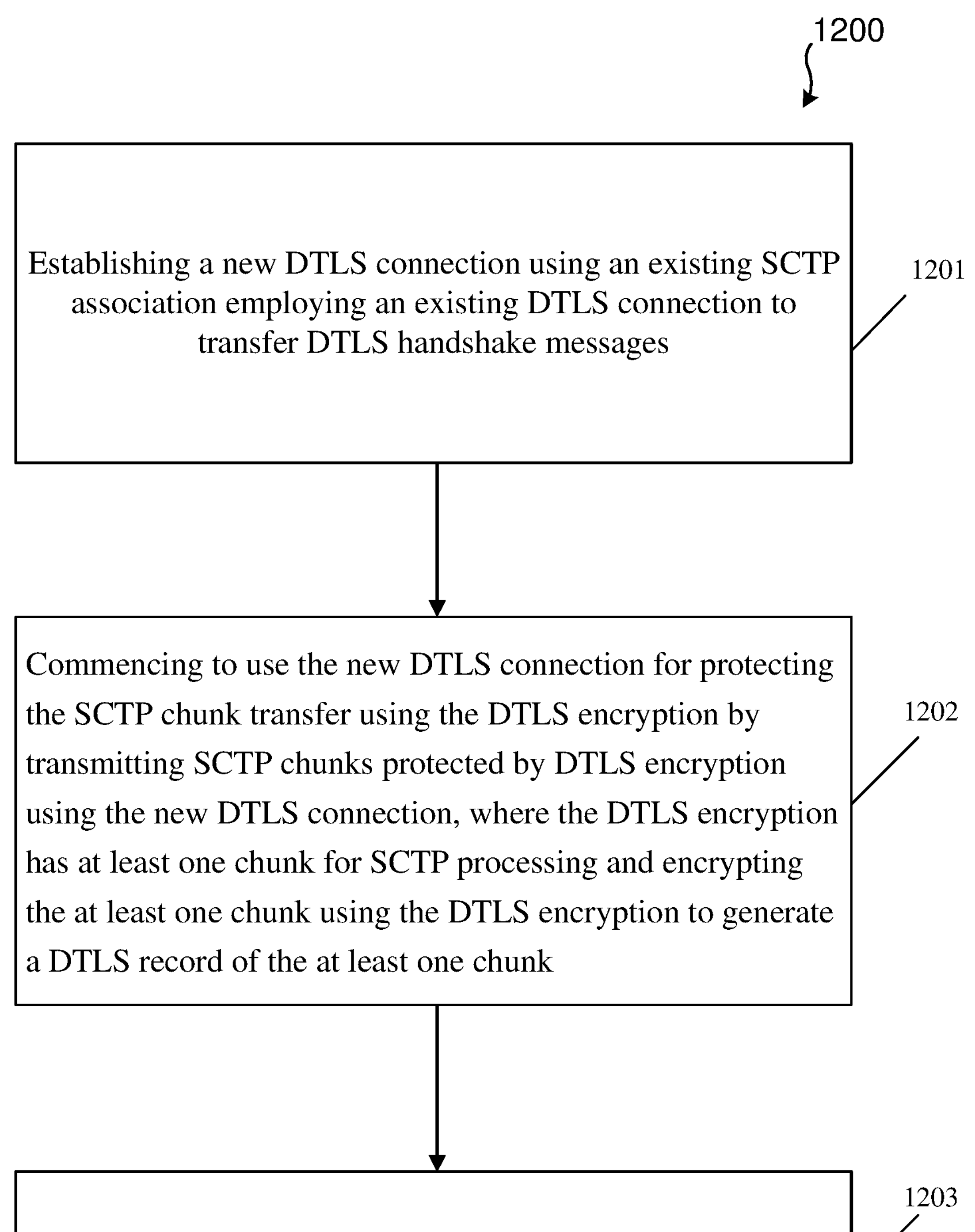
FIG. 12 shows a method at the first network node for rekeying or re-authenticating security protection for SCTP association in accordance with some embodiments of the present disclosure.

FIG. 12 shows a method 1200 at the first network node for rekeying or re-authenticating security protection for SCTP association between the first network node and a second network node protected using DTLS encryption for SCTP chunk transfer. At operation 1201, the first network node provides for establishing a new DTLS connection between the first network node and the second network node using an existing SCTP association employing an existing DTLS connection between the first network node and the second network node to transfer DTLS handshake messages.

At operation 1202, the first network node provides for commencing to use the new DTLS connection for protecting the SCTP chunk transfer using the DTLS encryption between the first network node and the second network node by transmitting, from the first network node to the second network node, SCTP chunks protected by DTLS encryption using the new DTLS connection, wherein the DTLS encryption comprises having at least one chunk for SCTP processing and encrypting the at least one chunk using the DTLS encryption to generate a DTLS record of the at least one chunk. At operation 1203, the first network node provides for closing the existing DTLS connection after an elapsed time period after commencing to use the new DTLS connection.

Figure 13:
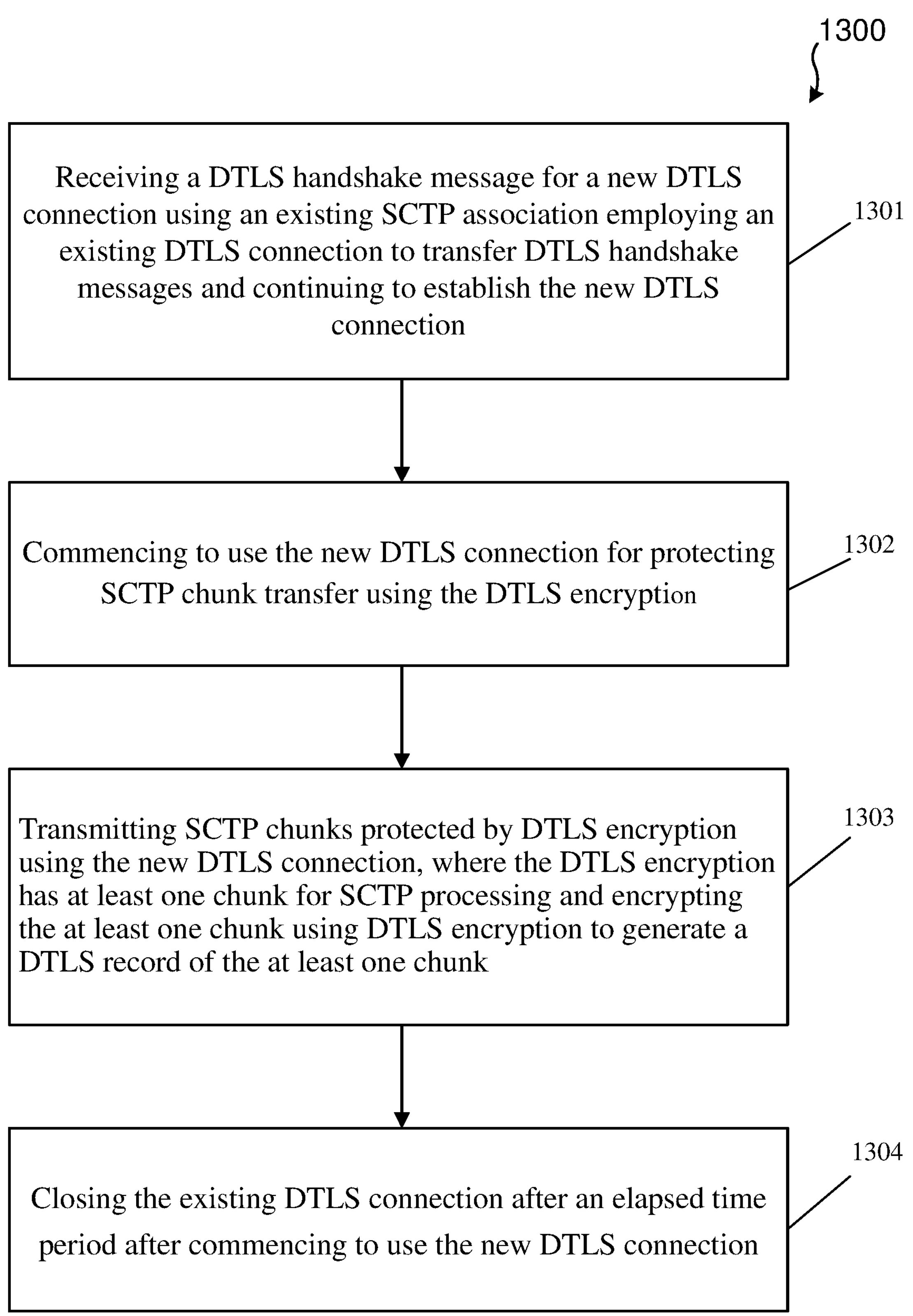
FIG. 13 shows a method at a second network node for rekeying or re-authenticating security protection for SCTP association in accordance with some embodiments of the present disclosure.

FIG. 13 shows a method 1300 at a second network node for rekeying or re-authenticating security protection for SCTP association between a first network node and the second network node protected using DTLS encryption for SCTP chunk transfer according to some embodiments of the present disclosure. At operation 1301, the second network node provides for receiving a DTLS handshake message from the first network node for a new DTLS connection between the first network node and the second network node using an existing SCTP association employing an existing DTLS connection between the first network node and the second network node to transfer DTLS handshake messages and continuing to establish the new DTLS connection. At operation 1302, the second network node provides for commencing to use the new DTLS connection for protecting SCTP chunk transfer using the DTLS encryption between the second network node and the first network node;

At operation 1303, the second network node provides for transmitting, from the second network node to the first network node, SCTP chunks protected by DTLS encryption using the new DTLS connection, wherein the DTLS encryption comprises having at least one chunk for SCTP processing and encrypting the at least one chunk using DTLS encryption to generate a DTLS record of the at least one chunk. At operation 1304, the second network node provides for closing the existing DTLS connection after an elapsed time period after commencing to use the new DTLS connection.

Figure 14:
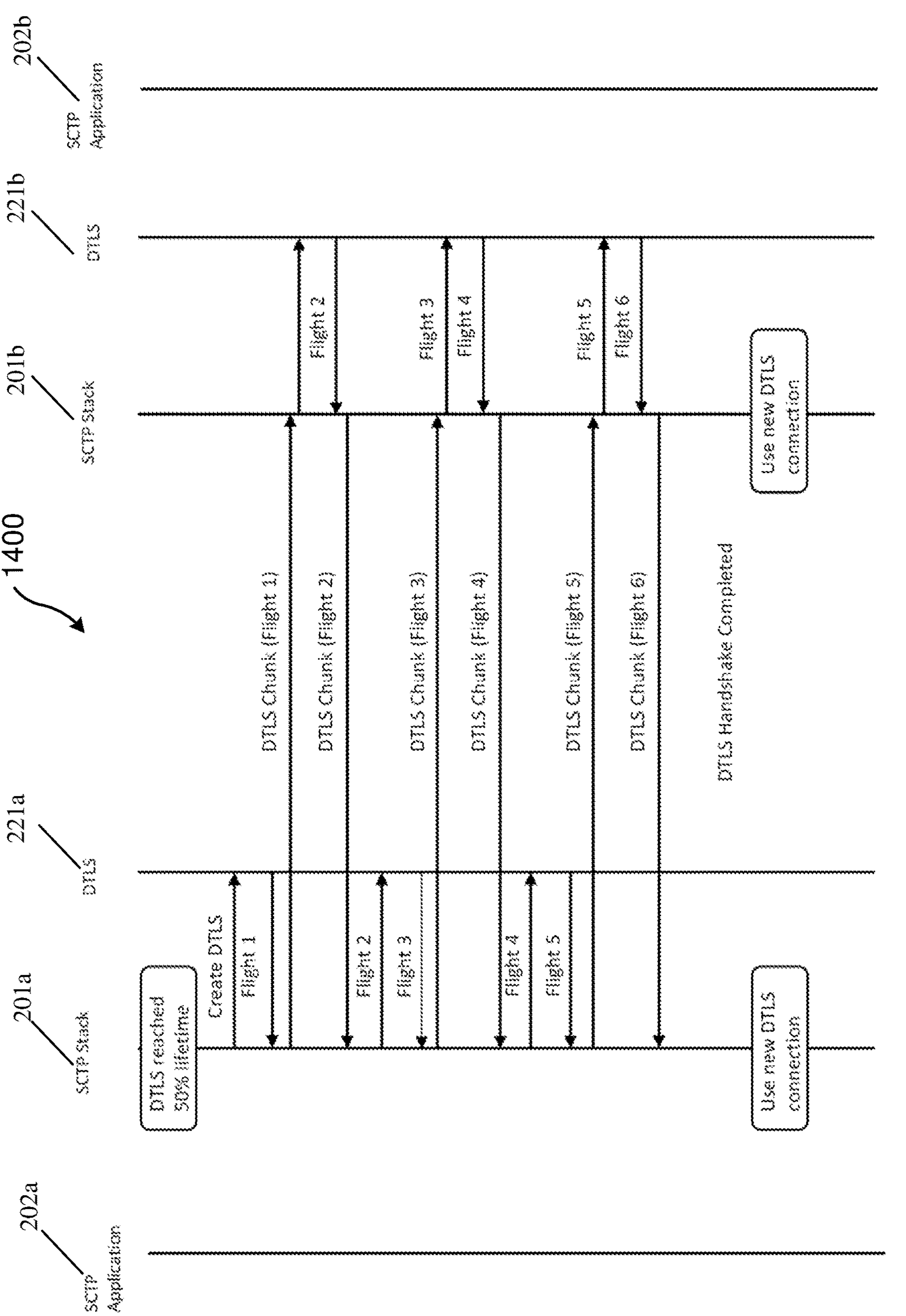
FIG. 14 shows a rekeying and/or re-authenticating procedure by establishing a new DTLS connection in parallel to an existing DTLS connection in accordance with some embodiments of the present disclosure.

FIG. 14 shows a rekeying and/or re-authenticating (rekeying/re-authenticating) procedure 1400 by establishing a new DTLS connection in parallel to an existing DTLS connection. The example shows that a new connection is to be established when the existing DTLS connection reaches 50% of allotted lifetime. However, any mode (time, amount of data, etc.) can be used, wherein when the existing connection reaches a set threshold value, a new connection can be initiated. Similar to the procedure illustrated in FIG. 6 for SCTP association setup, DTLS connection setup 1400 for the new connection in parallel to the existing connection is initiated by signaling for a handshake between the first and second network nodes for handshake to establish the new connection. Flights 1-6 involving DTLS chunks are transferred between the two SCTP stacks 201*a-b* to establish the handshake for the new DTLS connection.

From the time when the new DTLS connection is used for protection operations of outgoing SCTP packets, the old DTLS connection can be closed. To prevent losses of reordered packets, a small delay can be implemented. This delay does not need to be longer than the maximum reordering possible in the network. After that, the close request can be sent to the DTLS connection, which will normally result in a DTLS close notify message to be sent, that is then encapsulated in a DTLS chunk. Upon reception of the DTLS close notify the DTLS connection can be terminated, and the security context removed. In the case a late packet is delivered after the security context has been removed, the DTLS message or record can simply be dropped with no larger impact than a packet loss would have had.

When it is requested to shut down the SCTP association, the SCTP chunks including the SHUTDOWN and SHUTDOWN ACK are protected as any other chunk. When the SCTP association has been shut down, the DTLS connection state is discarded.

Thus, the above described method allows a SCTP association for the new DTLS connection to use an existing DTLS session for encryption of the SCTP chunk transfer carrying DTLS handshake messages. The new DTLS connection can be used for re-keying the security protection of a SCTP association, or re-authenticating (or re-authorizing) an existing SCTP connection. The technique allows for the second network node to identify which security context to use for received DTLS records based on the connection identifier when setting up the new connection. Furthermore, the techniques allows for the closing of the existing DTLS connection to be initiated in a DTLS message transmitted in a DTLS record. The closing of the existing DTLS connection can be initiated either by the first network node or the second network node.

Figure 15:
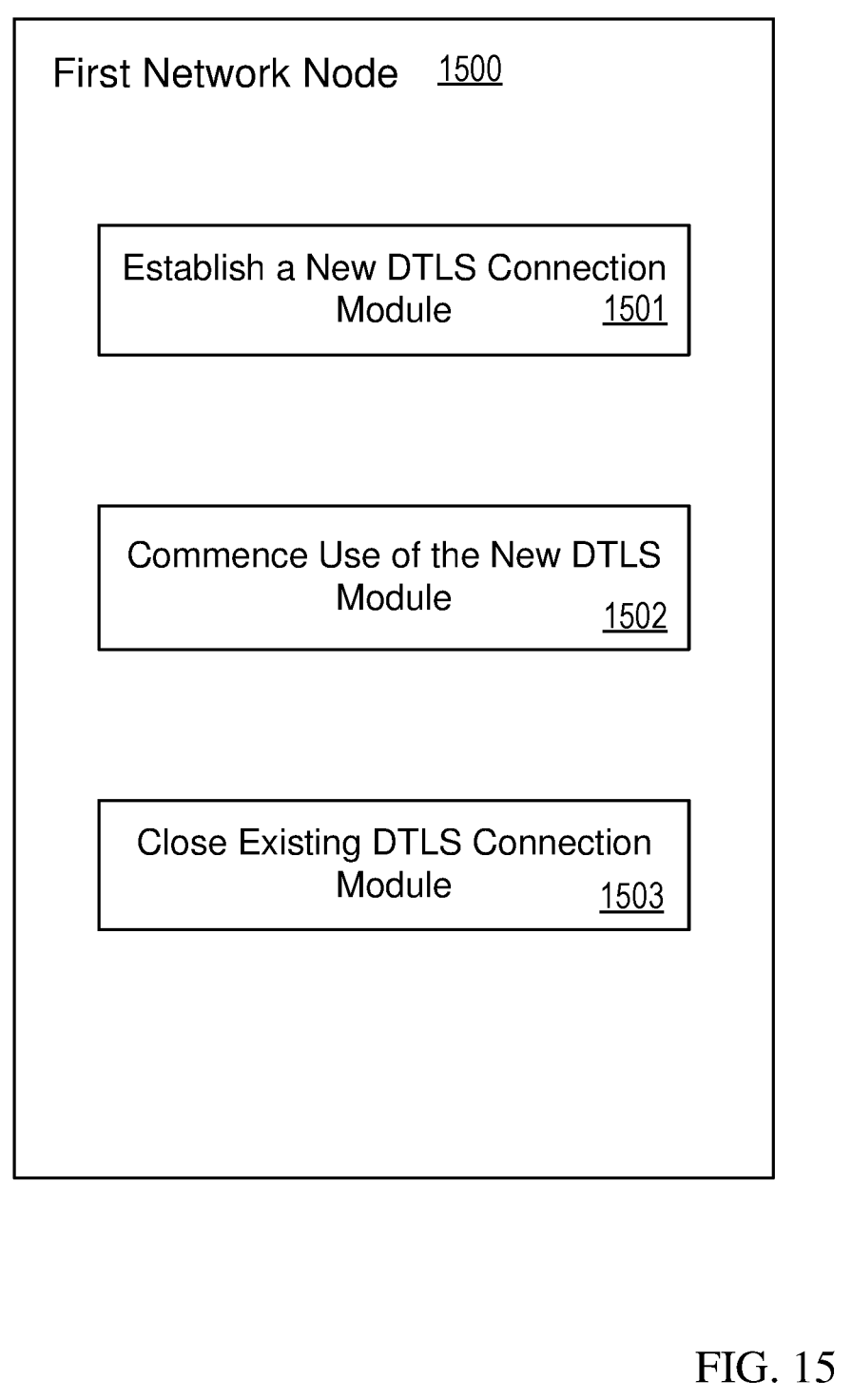

FIG. 15 shows a first network node 1500 that can implement the functions of the method 1200 of FIG. 12, as well as the various embodiments described in the disclosure. As shown, an Establish a New DTLS Connection module 1501 can perform operations corresponding to the operation 1201. A Commence Use of the New DTLS module 1502 can perform operations corresponding to the operation 1202. A Close Existing DTLS Connection module 1503 can perform operations corresponding to the operation 1503. The modules can be incorporated as part of the SCTP stack 201, or the SCTP stack 201 in combination with the IP function 203 for some embodiments.

In some embodiments, the modules 1501-1503 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the first network node 1500 are implemented in software. In other embodiments, the modules of the first network node 1500 are implemented in hardware. In further embodiments, the modules of the first network node 1500 are implemented in a combination of hardware and software. In some embodiments, the computer program can be provided on a carrier, where the carrier is one of an electronic signal, optical signal, radio signal or computer storage medium.

Figure 16:
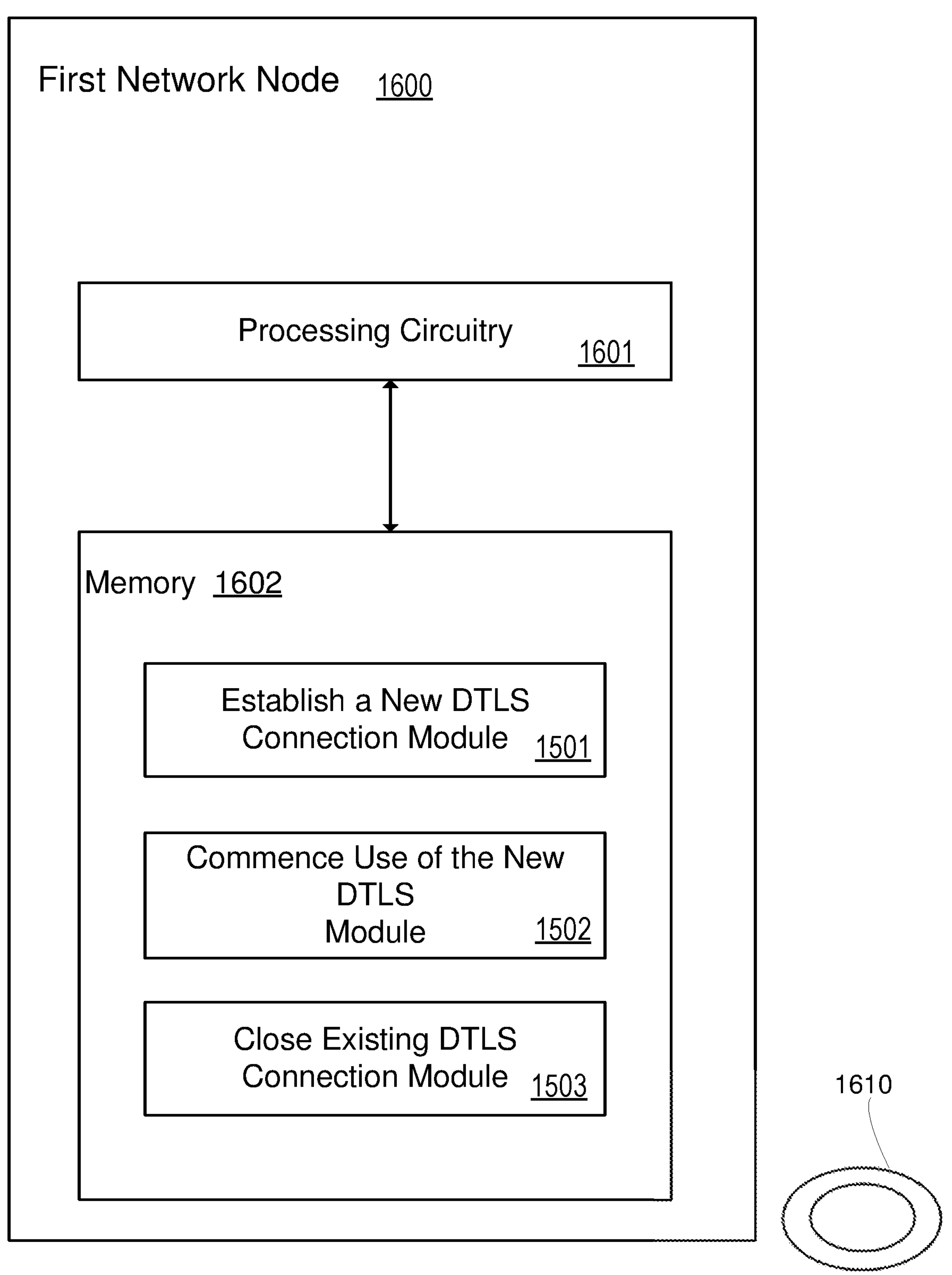
FIG. 16 shows another first network node that can implement the functions of the method shown in FIG. 12 in accordance with some embodiments of the present disclosure.

FIG. 16 shows a first network node 1600 that can implement the functions of the method 1200 of FIG. 12, as well as the various embodiments described in the disclosure. In some embodiments, the first network node 1600 can be configured to implement the modules 1501-1503 of FIG. 15, wherein the instructions of the computer program for providing the functions of modules 1501-1503 reside in a memory 1602.

The first network node 1600 comprises processing circuitry (such as one or more processors) 1601 and a non-transitory machine-readable medium, such as the memory 1602. The processing circuitry 1601 provides the processing capability. The memory 1602 can store instructions which, when executed by the processing circuitry 1601, are capable of configuring the first network node 1600 to perform the methods described in the present disclosure. The memory can be a computer readable storage medium, such as, but not limited to, any type of disk 1610, including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

FIG. 17 shows a second network node 1700 that can implement the functions of the method 1300 of FIG. 13, as well as the various embodiments described in the disclosure. As shown, a Receive message for new DTLS Connection module 1701 can perform operations corresponding to the operation 1301. A Commence using new DTLS Connection module 1702 can perform operations corresponding to the operation 1302. A Transmit using new DTLS Connection module 1703 can perform operations corresponding to the operation 1303. A Close Existing DTLS Connection module 1704 can perform operations corresponding to the operation 1304. The modules can be incorporated as part of the SCTP stack 201, or the SCTP stack 201 in combination with the IP function 203 for some embodiments.

In some embodiments, the modules 1701-1704 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the second network node 1700 are implemented in software. In other embodiments, the modules of the second network node 1700 are implemented in hardware. In further embodiments, the modules of the second network node 1700 are implemented in a combination of hardware and software. In some embodiments, the computer program can be provided on a carrier, where the carrier is one of an electronic signal, optical signal, radio signal or computer storage medium.

Figure 18:
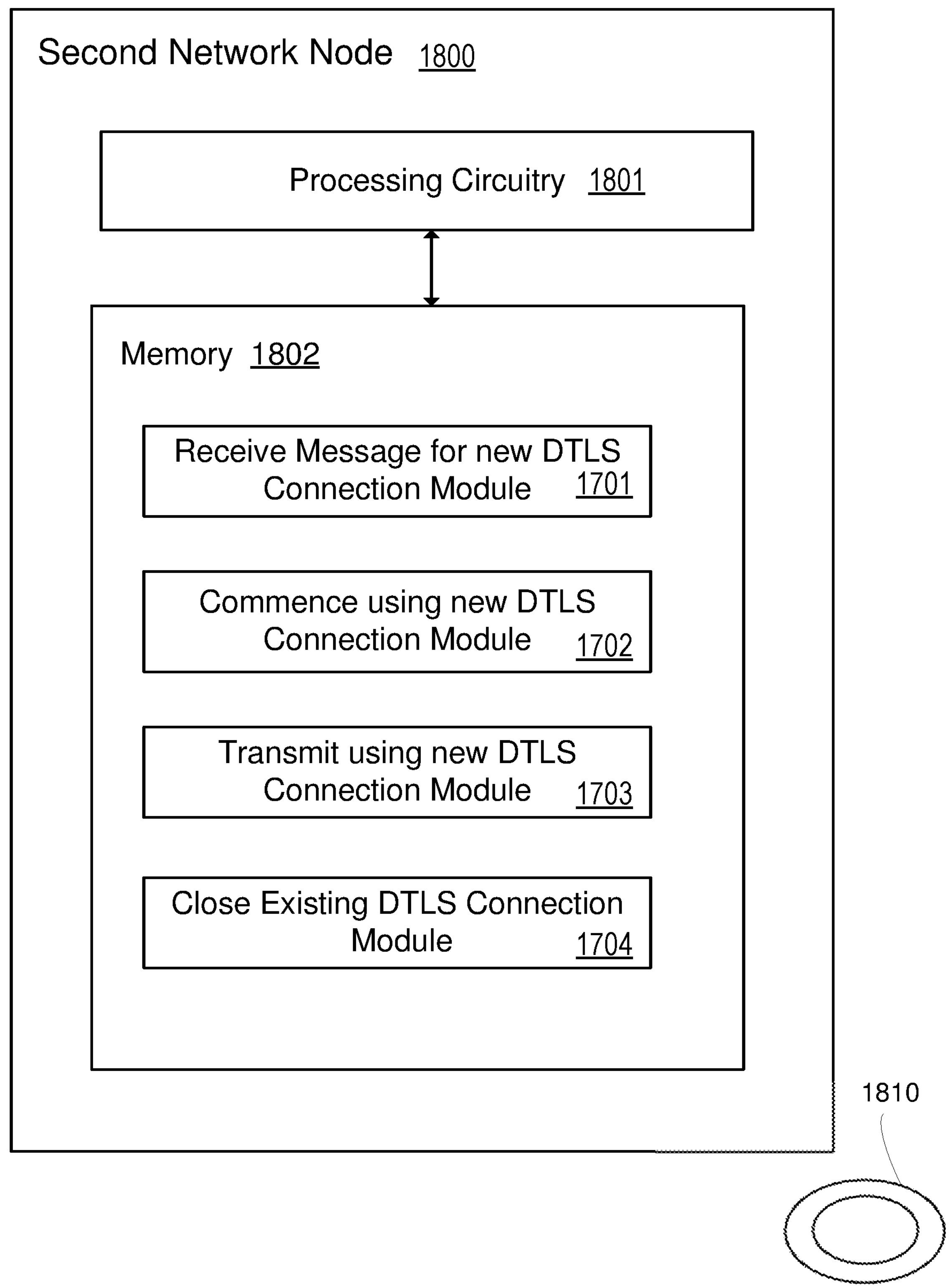
FIG. 18 shows another second network node that can implement the functions of the method shown in FIG. 13 in accordance with some embodiments of the present disclosure.

FIG. 18 shows a second network node 1800 that can implement the functions of the method 1300 of FIG. 13, as well as the various embodiments described in the disclosure. In some embodiments, the second network node 1800 can be configured to implement the modules 1701-1704 of FIG. 17, wherein the instructions of the computer program for providing the functions of modules 1701-1704 reside in a memory 1802.

The second network node comprises processing circuitry (such as one or more processors) 1801 and a non-transitory machine-readable medium, such as the memory 1802. The processing circuitry 1801 provides the processing capability. The memory 1802 can store instructions which, when executed by the processing circuitry 1801, are capable of configuring the second network node 1800 to perform the methods described in the present disclosure. The memory can be a computer readable storage medium, such as, but not limited to, any type of disk 1810, including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method at a first network node for rekeying or re-authenticating security protection for Stream Control Transmission Protocol (SCTP) association between the first network node and a second network node protected using Datagram Transport Layer Security (DTLS) encryption for SCTP chunk transfer, the method comprising:

establishing a new DTLS connection between the first network node and the second network node using an existing SCTP association employing an existing DTLS connection between the first network node and the second network node to transfer DTLS handshake messages;

commencing to use the new DTLS connection for protecting the SCTP chunk transfer using the DTLS encryption between the first network node and the second network node by transmitting, from the first network node to the second network node, SCTP chunks protected by DTLS encryption using the new DTLS connection, wherein the DTLS encryption comprises having at least one chunk for SCTP processing and encrypting the at least one chunk using the DTLS encryption to generate a DTLS record of the at least one chunk; and closing the existing DTLS connection after an elapsed time period after commencing to use the new DTLS connection.

2. The method according to claim 1, wherein the DTLS encryption further comprises:

attaching a SCTP chunk header to the DTLS record to identify the at least one chunk as DTLS encrypted.

3. The method according to claim 2, wherein the SCTP chunk header comprises information to identify the DTLS record, the information comprising:

type of chunk;

connection identifier;

chunk length; or any combination thereof.

4. The method according to claim 3, wherein the second network node identifies which security context to use for received DTLS records based on the connection identifier.

5. The method according to claim 1, wherein the DTLS encryption further comprises:

attaching a common SCTP header to the DTLS record to generate a SCTP packet for SCTP transmission to the second network node; or attaching a common SCTP header to a SCTP chunk header and the DTLS record to generate a SCTP packet for SCTP transmission to the second network node.

6. The method according to claim 1, wherein a SCTP association for the new DTLS connection uses an existing DTLS session for encryption of the SCTP chunk transfer carrying DTLS handshake messages.

7. The method according to claim 1, wherein the new DTLS connection is for re-keying the security protection of a SCTP association.

8. The method according to claim 1, wherein the new DTLS connection is for re-authenticating the security protection of a SCTP association.

9. The method according to claim 1, wherein the closing the existing DTLS connection is initiated in a DTLS message transmitted in a DTLS record.

10. The method according to claim 1, wherein the closing of the existing DTLS connection is initiated either by the first network node or the second network node.

11. A method at a second network node for rekeying or re-authenticating security protection for Stream Control Transmission Protocol (SCTP) association between a first network node and the second network node protected using Datagram Transport Layer Security (DTLS) encryption for SCTP chunk transfer, the method comprising:

receiving, at the second network node, a DTLS handshake message from the first network node for a new DTLS connection between the first network node and the second network node using an existing SCTP association employing an existing DTLS connection between the first network node and the second network node to transfer DTLS handshake messages and continuing to establish the new DTLS connection;

commencing to use the new DTLS connection for protecting SCTP chunk transfer using the DTLS encryption between the second network node and the first network node;

transmitting, from the second network node to the first network node, SCTP chunks protected by DTLS encryption using the new DTLS connection, wherein the DTLS encryption comprises having at least one chunk for SCTP processing and encrypting the at least one chunk using DTLS encryption to generate a DTLS record of the at least one chunk; and closing the existing DTLS connection after an elapsed time period after commencing to use the new DTLS connection.

12. The method according to claim 11, wherein the DTLS encryption further comprises:

attaching a SCTP chunk header to the DTLS record to identify the at least one chunk as DTLS encrypted.

13. The method according to claim 11, wherein the DTLS encryption further comprises:

attaching a common SCTP header to the DTLS record to generate a SCTP packet for SCTP transmission; or attaching a common SCTP header to a SCTP chunk header and the DTLS record to generate a SCTP packet for SCTP transmission.

14. The method according to claim 11, wherein a SCTP association for the new DTLS connection uses an existing DTLS session for encryption of the SCTP chunk transfer carrying the DTLS handshake messages.

15. A first network node to rekey or re-authenticate security protection for Stream Control Transmission Protocol (SCTP) association between the first network node and a second network node protected using Datagram Transport Layer Security (DTLS) encryption for SCTP chunk transfer, the first network node configured to:

establish a new DTLS connection between the first network node and the second network node using an existing SCTP association employing an existing DTLS connection between the first network node and the second network node to transfer DTLS handshake messages;

commence to use the new DTLS connection for protecting the SCTP chunk transfer using the DTLS encryption between the first network node and the second network node by a transmit, from the first network node to the second network node, of SCTP chunks protected by DTLS encryption using the new DTLS connection, wherein the DTLS encryption comprises having at least one chunk for SCTP processing and encryption of the at least one chunk using the DTLS encryption to generate a DTLS record of the at least one chunk; and close the existing DTLS connection after an elapsed time period after commencement to use the new DTLS connection.

16. The first network node according to claim 15, wherein the DTLS encryption further comprises:

attachment of a SCTP chunk header to the DTLS record to identify the at least one chunk as DTLS encrypted.

17. The first network node according to claim 15, wherein the DTLS encryption further comprises:

attachment of a common SCTP header to the DTLS record to generate a SCTP packet for SCTP transmission to the second network node; or attachment of a common SCTP header to a SCTP chunk header and the DTLS record to generate a SCTP packet for SCTP transmission to the second network node.

18. The first network node according to claim 15, wherein the new DTLS connection is to re-key the security protection of a SCTP association.

19. The first network node according to claim 15, wherein the new DTLS connection is to re-authenticate the security protection of a SCTP association.

20. A second network node to rekey or re-authenticate security protection for Stream Control Transmission Protocol (SCTP) association between a first network node and the second network node protected using Datagram Transport Layer Security (DTLS) encryption for SCTP chunk transfer, the second network node configured to:

receive, at the second network node, a DTLS handshake message from the first network node for a new DTLS connection between the first network node and the second network node using an existing SCTP association employing an existing DTLS connection between the first network node and the second network node to transfer DTLS handshake messages and continue to establish the new DTLS connection;

commence to use the new DTLS connection for protecting SCTP chunk transfer using the DTLS encryption between the second network node and the first network node;

transmit, from the second network node to the first network node, SCTP chunks protected by DTLS encryption using the new DTLS connection, wherein the DTLS encryption comprises having at least one chunk for SCTP processing and encrypting the at least one chunk using DTLS encryption to generate a DTLS record of the at least one chunk; and close the existing DTLS connection after an elapsed time period after commencing to use the new DTLS connection.

* * * * *